(12) United States Patent
Glöggler et al.

(10) Patent No.: US 12,744,988 B2
(45) Date of Patent: Sep. 22, 2026

(54) ILLUMINATING DEVICE, IMAGING DEVICE AND METHOD FOR OPERATING SAME

(71) Applicant: KARL STORZ SE & Co. KG, Tuttlingen (DE)

(72) Inventors: Bernhard Glöggler, Tuttlingen (DE); Thomas Hinding, Tuttlingen (DE); Uwe Martin, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 0 days.

(21) Appl. No.: 19/137,736

(22) PCT Filed: Dec. 18, 2023

(86) PCT No.: PCT/EP2023/086395
§ 371 (c)(1),
(2) Date: Jun. 11, 2025

(87) PCT Pub. No.: WO2024/133104
PCT Pub. Date: Jun. 27, 2024

(65) Prior Publication Data

US 2026/0205676 A1 Jul. 16, 2026

(30) Foreign Application Priority Data

Dec. 19, 2022 (DE) ..................... 10 2022 133 966.1

(51) Int. Cl.
*H04N 23/56* (2023.01)
*F21V 29/503* (2015.01)
(Continued)

(52) U.S. Cl.
CPC ........... *H04N 23/56* (2023.01); *F21V 29/503* (2015.01); *F21V 29/83* (2015.01); *H04N 23/555* (2023.01)

(58) Field of Classification Search
None
See application file for complete search history.

(56) References Cited

U.S. PATENT DOCUMENTS

2008/0117597 A1 5/2008 Zhou et al.
2011/0305020 A1 12/2011 Wang
(Continued)

FOREIGN PATENT DOCUMENTS

DE 202014010558 U1 12/2015
DE 102019114885 B3 8/2020
DE 102020105458 A1 6/2021

OTHER PUBLICATIONS

International Search Report for International Application No. PCT/EP2023/086395, mailed Mar. 22, 2024.
(Continued)

*Primary Examiner* — Mohammed Jebari
(74) *Attorney, Agent, or Firm* — Jason H. Vick; Amped IP LLC

(57) ABSTRACT

The invention relates to an illumination device (102; 202; 302; 402; 502; 602; 702; 802), comprising: at least one heat sink (104; 204; 304; 504; 604; 704; 804); at least one first lighting element (106; 206; 406; 706); at least one first cooling body section (108; 208; 308; 408; 508; 608) which is thermally coupled to the first lighting element (106; 206; 406; 706) and which is configured to absorb waste heat from the first lighting element (106); at least one first waste heat path (110; 210; 310) which thermally connects the first cooling body section (108; 208; 308; 408; 508; 608) to the heat sink (104; 204; 304; 504; 604; 704; 804) so that the waste heat of the first lighting element (106; 206; 406; 706) can be dissipated via the first waste heat path (110; 210; 310); at least one second lighting element (112; 212; 412; 712); at least one second cooling body section (114; 214; 314; 414) which is thermally coupled to the second lighting element (112; 212; 412; 712) and which is configured to absorb waste heat from the second lighting element (112; 212; 412; 712); at least one second waste heat path (116; 216; 316) which thermally connects the second cooling body
(Continued)

section (114; 214; 314; 414) to the heat sink (104; 204; 304; 504; 604; 704; 804) such that the waste heat from the second lighting element (112; 212; 412; 712) can be dissipated via the second waste heat path (116; 216; 316); and at least one adjusting element (118; 218; 318; 418) that is arranged between the first cooling body section (108; 208; 308; 408; 508; 608) and the second cooling body section (114; 214; 314; 414) and that is configured to adjust a heat flow from the first cooling body section (108; 208; 308; 408; 508; 608) to the second cooling body section (114; 214; 314; 414). The invention further relates to an imaging device (10) with an illumination device (102; 202; 302; 402; 502; 602; 702; 802).

16 Claims, 12 Drawing Sheets

(51) Int. Cl.

*F21V 29/83* (2015.01)
*H04N 23/50* (2023.01)

(56) References Cited

U.S. PATENT DOCUMENTS

2016/0126698 A1 5/2016 Nishio et al.
2016/0235285 A1 8/2016 Shirota et al.
2016/0353984 A1* 12/2016 Shirota .................. A61B 1/128
2017/0319056 A1 11/2017 Shirota et al.
2018/0073715 A1* 3/2018 Oki ........................ A61B 1/128
2019/0021583 A1 1/2019 Yoshida et al.
2020/0300451 A1 9/2020 Oeki et al.
2021/0208385 A1* 7/2021 Pascale .............. G02B 23/2476
2021/0393118 A1 12/2021 Kuboi

OTHER PUBLICATIONS

Written Opinion for International Application No. PCT/EP2023/086395, mailed Mar. 22, 2024.
Office Action for corresponding German Patent Application No. 102022133966.1, mailed Aug. 3, 2023.

* cited by examiner 331
340
358
366
362
370
328
328
330
308
324
310,316,326,360,368
302
304
320
318
372
314
327
328

831
840
802
804
804
804
804
804
872

ILLUMINATING DEVICE, IMAGING DEVICE AND METHOD FOR OPERATING SAME

CROSS REFERENCE TO RELATED APPLICATIONS

This application is a national stage application under 35 U.S.C. 371 of PCT Application No. PCT/EP2023/086395 having an international filing date of 18 Dec. 2023, which designated the United States, which PCT application claimed the benefit of German Application No. 10 2022 133 966.1, filed 19 Dec. 2022, each of which are incorporated herein by reference in their entirety.

The present invention relates to an illumination device, in particular for providing illumination light for a medical imaging instrument such as an endoscope, to an imaging device as well as to a method for operating an illumination device and/or imaging device.

Imaging devices, such as endoscopic or exoscopic devices that produce multispectral or hyperspectral images, are known from the prior art. Multispectral or hyperspectral images have a spectral dimension in addition to two spatial dimensions, such as a conventional image from a camera. The spectral dimension includes multiple spectral bands (wavelength bands). Multispectral and hyperspectral images differ substantially in the number and width of their spectral bands.

Some imaging devices are known for producing such multispectral or hyperspectral images, especially in the context of medical applications. For example, DE 20 2014 010 558 U1 describes a device for acquiring a hyperspectral image of an examination region of a body. The device includes an input lens for generating an image in an image plane and a slit-shaped aperture in the image plane for masking out a slit-shaped region of the image. The light passing through the aperture is spread out by a dispersive element and recorded by a camera sensor. This allows the camera sensor to record a plurality of spectra, each with an associated spatial coordinate, along the longitudinal direction of the slit-shaped aperture. The device described is further configured to record further spectra along the longitudinal direction of the slit-shaped aperture in a direction different from the longitudinal direction of the slit-shaped aperture. The method underlying this disclosure for generating multispectral or hyperspectral images is also known as the so-called pushbroom method.

In addition to the pushbroom method, there are other methods for generating multispectral or hyperspectral images. In the so-called whiskbroom method, the region under study or else the object is scanned point by point and a spectrum is obtained for each point. In contrast, the staring method involves taking multiple images with the same spatial coordinates. Different spectral filters and/or illumination sources are used from image to image to resolve spectral information. Furthermore, there are methods according to which a two-dimensional multi-color image is broken down into a plurality of individual spectral images using suitable optical elements, such as optical slicers, lenses and prisms, which images are simultaneously acquired on different detectors or detector regions. This is sometimes referred to as the snapshot approach.

As described in DE 10 2020 105 458 A1, multispectral and hyperspectral imaging devices are particularly suitable as endoscopic imaging devices. In this context, multispectral and/or hyperspectral imaging is a fundamental field of application, for example for diagnostics and for assessing the success or quality of an intervention.

In addition, white light imaging is used in particular in the medical imaging field. Observed tissue is illuminated with white light and images of the tissue are generated using a camera or other image acquisition sensor system, which can then be displayed to a user.

Fluorescence imaging is also used, in particular in the medical imaging field. Tissue is specifically illuminated in a certain wavelength range in order to excite fluorescent dye molecules that have been specifically introduced into certain entities such as tissue regions. The subsequently emitted light with a longer wavelength can be observed through a suitably selected filter, by means of which the excitation light can be blocked.

Multimodal imaging devices allow the capture of, optionally, white light images and/or multispectral images and/or fluorescence images and/or hyperspectral images. Examples of such imaging devices are multimodal endoscopes and multimodal exoscopes. To realize different modes, illumination devices can be required that are operable in different illumination modes in order to generate illumination light in different spectral ranges, as needed.

In order to be able to provide targeted illumination light in a specific wavelength range, it can be necessary to provide an illumination device with a plurality of lighting elements, each of which emits light in its own appropriate wavelength range. Different lighting elements then emit light in different wavelength ranges. However, the wavelength range of the emitted light of each of the lighting elements can depend on the temperature of the respective lighting element and can shift with heating, for example. Due to the heating of the lighting element, it can happen that the emitted wavelength range shifts in such a way that it lies at least partially outside the desired wavelength range and/or at least partially outside a spectral selection range of a filter by means of which the targeted wavelength range is set. Furthermore, the results of multi- and hyperspectral imaging can change and/or be distorted by a shift in the emitted wavelength range. In addition, it can happen that the emitted wavelength range shifts, for example, during the performance of a diagnostic procedure and in particular after a calibration of the illumination and/or imaging device. As a result, among other things incorrect multi- and/or hyperspectral imaging can occur and/or such imaging may no longer be possible. A further difficulty can arise from the provision of a plurality of lighting elements. For example, if one of the lighting elements is operated and this lighting element generates waste heat, it can happen that another of the lighting elements is heated by the waste heat. This can change the emission spectrum of the other lighting element.

Proceeding from the prior art, the invention is based on the object of providing light reliably and with a high degree of spectral stability.

This object is achieved according to the invention by an illumination device, an imaging device, and a method for operating an illumination device and/or imaging device as described herein and defined in the claims.

The present invention provides an illumination device, in particular for providing illumination light for a medical imaging instrument such as an endoscope. The illumination device comprises at least one heat sink, at least one first lighting element, at least one first cooling body section which is thermally coupled to the first lighting element and which is configured to absorb waste heat from the first lighting element, and at least one first waste heat path which thermally connects the first cooling body section to the heat sink in such a way that the waste heat from the first lighting element can be dissipated via the first waste heat path. Furthermore, the illumination device comprises at least one second lighting element, at least one second cooling body section which is thermally coupled to the second lighting element and which is configured to absorb waste heat from the second lighting element, at least one second waste heat path which thermally connects the second cooling body section to the heat sink so that the waste heat from the second lighting element can be dissipated via the second waste heat path, and at least one adjusting element which is arranged between the first cooling body section and the second cooling body section and which is configured to adjust a heat flow from the first cooling body section to the second cooling body section.

In addition, an imaging device is provided, comprising an illumination device according to the invention and an imaging instrument that can be connected to the illumination device. The illumination device can comprise an optical interface to which the imaging instrument can be connectable.

Furthermore, a method for operating an illumination device and/or for operating an imaging device is provided.

The features according to the invention make it possible to provide light reliably and with a high degree of spectral stability. Advantageously, the first lighting element and/or the second lighting element can be kept within a desired temperature range. This can ensure that the emitted wavelength range of the individual lighting elements remains essentially the same or can be kept within a desired range. In addition, an operation of, for example, the first lighting element, due to which it generates waste heat, can be at least substantially be prevented from heating the second lighting element beyond a target operating temperature. Consequently, both lighting elements can be operated in such a way that light can be kept within a wavelength range that is essentially optimal for operation of the imaging device. Furthermore, the adjusting element can ensure that the first lighting element and the second lighting element mutually influence each other in such a way that light can be provided efficiently. This can be achieved in that both lighting elements can be kept within a preferred temperature range by the adjusting element. Furthermore, overall the first lighting element and/or the second lighting element can be prevented from moving out of the preferred temperature range. If, for example, multi- and/or hyperspectral imaging is carried out with the imaging device and conclusions are drawn regarding physiological tissue parameters, in particular on the basis of multi- and/or hyperspectral image data, even slight deviations in the emitted wavelength range, for example 5 nm-10 nm wavelength deviation, can cause a distortion of the conclusions. This can be at least substantially prevented by the present invention, or at least the extent of such deviations can be reduced.

The illumination device allows light from a plurality of lighting elements to be combined efficiently, for example with low light losses, and/or coupled into a common optical path. For this purpose, the illumination device can comprise at least one beam combiner. The beam combiner can generally be an assembly that is configured to combine light from a plurality of lighting elements, each of which defines a beam path. In particular, combining can mean that the light is coupled into a common optical path. The lighting elements can be configured to provide light within a specific wavelength range or with specific spectral properties. The light can expediently be coupled into the endoscope and/or an exoscope via a common optical path and in particular via only one optical path. For this purpose, the illumination device comprises the optical interface. The endoscope and/or other imaging instruments, in particular medical imaging instruments, can be coupled to the illumination device via the optical interface. The optical interface can be designed in such a way that light can be coupled into an imaging instrument preferably with low light losses and/or with an at least essentially slight wavelength change.

The lighting elements can be configured to emit light within different wavelength ranges. The beam combiner can comprise at least one and in particular two partially transparent mirrors which reflect light within a narrow wavelength range, each of which is adapted to the wavelength range of one of the lighting elements. Furthermore, it can be provided that the mirror(s) deflect(s) the light in a common direction or to the same side, in particular to an output side, of the beam combiner. It can be provided that light can be combined, coupled into the common optical path and/or deflected to the output side of the beam combiner only within the two narrow wavelength ranges in which one of the two mirrors reflects light. The lighting elements can be provided to jointly cover at least a spectral range from 400 nm to 950 nm. The illumination device can comprise two, three, four, five, six or seven lighting elements. In particular, each of the lighting elements can be provided to provide light within its own wavelength range.

The lighting elements can comprise single-color and/or narrow-band emitting LEDs (light-emitting diodes) and/or laser diodes. Furthermore, at least one of the lighting elements can be a white-light LED or another white-light source or at least one broadband emitting lighting element. In some embodiments, the illumination unit comprises at least one blue luminous element, at least one red luminous element, at least one dark red luminous element and at least one near-IR luminous element (near-infrared luminous element), in particular LEDs or laser diodes in each case. In addition, the illumination unit can comprise at least one white light LED or other white light source.

The heat sink can be a body or a region that is configured to transfer thermal energy to an adjacent medium. In particular, the heat sink can be understood as a cooling device. For example, the heat sink can be made of a material with a low thermal resistance, such as aluminum or copper. In addition, the heat sink can be designed in such a way that the transfer of thermal energy is improved, for example by enlarging a surface region of the heat sink. Furthermore, the heat sink can be designed with several parts.

Furthermore, the illumination device can comprise further devices that improve a transfer of thermal energy. For example, convection can be improved by providing a ventilation device. The ventilation device can be provided to improve a cooling effect of the heat sink, of the first cooling body section and/or of the second cooling body section.

The first cooling body section and/or the second cooling body section are preferably each arranged at a short spatial distance from the respective lighting element. In general, a cooling body section is provided to absorb, temporarily store and/or transfer waste heat from a lighting element. Preferably, for example, the first lighting element is arranged on the first cooling body section. Means can be provided to improve the heat transfer from the lighting element to the cooling body section. For example, a thermal paste and/or a deformable coating can be provided between the lighting element and the cooling body section in order to reduce an air gap between them.

The waste heat temporarily stored and/or absorbed by the cooling body section is dissipated to the heat sink via the waste heat path, for example via the first waste heat path in the case of the first cooling body section. Various means can be provided to connect the cooling body section to the heat sink. The cooling body section can, for example, be a section of the heat sink itself. Alternatively or additionally, at least one thermal connection element separate from the heat sink can be provided.

The adjusting element is in particular suitable for adjusting and/or influencing a heat flow. For example, it can comprise and/or be a recess and adjust the heat flow by providing and/or enlarging an air gap. Furthermore, it can comprise a heat-conducting element that preferentially conducts thermal energy within a certain temperature range. In some embodiments, the heat-conducting element can have a first thermal conductivity in a first temperature range and a second thermal conductivity different from the first thermal conductivity in a second temperature range different from the first temperature range. Furthermore, the adjusting element can be configured to conduct thermal energy up to a limit value and, in particular, to have an abruptly reduced thermal conductivity when the limit value is reached and/or exceeded and/or undershot. Adjusting heat flow can mean in particular regulating the heat flow. In addition, heat can be dissipated to one of the first and/or second cooling body sections.

Advantageously, the first and/or the second cooling body sections can thereby be heated in order to reach an operating temperature. Furthermore, the adjusting element can be configured to limit the heat flow if the heat flow exceeds a limit value and/or at least one of the first cooling body section and/or the second cooling body section exceeds a critical temperature. The critical temperature can be a temperature at which the emitted wavelength range of the corresponding lighting element differs significantly from a provided wavelength range and/or by more than a predetermined spectral offset, for example by more than 20 nm, more than 10 nm or more than 5 nm.

Furthermore, it can be provided that the heat flow from the first cooling body section to the second cooling body section can be adjusted by the adjusting element in such a way that the first cooling body section is largely thermally decoupled from the second cooling body section. This can ensure that the lighting elements do not influence each other when the illumination unit is in operation. In this context, "thermally largely decoupled" can be understood in particular to mean that a temperature change of one of the affected cooling body sections by a first temperature amount causes at most a temperature change of the other of the affected cooling body sections by a second temperature amount, wherein the second temperature amount is at least a factor of 2, at least a factor of 3, at least a factor of 5, at least a factor of 10 or even at least a factor of 20 smaller than the first temperature amount, in particular considered over a period of at least 1 min, at least 2 min, at least 5 min, at least 10 min or even at least 20 min. In particular, "influencing" can mean mutual heating. For example, if one of the lighting elements is used preferentially, in particular for white-light imaging, thermal decoupling can ensure that the other lighting element is not heated above the critical temperature. Consequently, the reliability of the illumination unit is improved.

In addition, the first cooling body section and the second cooling body section can be integrally formed. For example, the first cooling body section and the second cooling body section can each be a section of a cooling body, in particular of a central cooling body, of the illumination device. Advantageously, this can increase the efficiency of the illumination device.

In addition, the adjusting element can comprise a recess that separates the first cooling body section from the second cooling body section. In particular, the dimensions of the recess can be adapted to the waste heat development of the corresponding lighting elements and/or to the cooling effect of the cooling body sections and/or the heat sink. The first waste heat path and/or the second waste heat path can be defined by the adjusting element. Advantageously, the design can be simplified and made more efficient.

Furthermore, the illumination device can comprise at least one third lighting element, at least one third cooling body section which is thermally coupled to the third lighting element and which is configured to absorb waste heat from the third lighting element, at least one third waste heat path which thermally connects the third cooling body section to the heat sink in such a way that the waste heat from the third lighting element can be dissipated via the third waste heat path, and at least one further adjusting element which is arranged between the second cooling body section and the third cooling body section and which is configured to adjust a heat flow from the second cooling body section to the third cooling body section in such a way that said heat flow differs from the heat flow between the first cooling body section and the second cooling body section. Advantageously, the heat flow between the corresponding cooling body sections can be adjustable in connection with the operating characteristics of the lighting means associated with the cooling body sections. For example, if the second lighting means develops more waste heat and/or is longer in operation than the first and/or third lighting means, the heat flow will be adjustable according to the operating characteristics of the first and/or third lighting means. Advantageously, the heat flow between the lighting means can be flexibly adjusted, wherein the heat flow can be adjusted depending on the operating state of the illumination device. For example, at least one of the adjusting elements can be configured to adjust the heat flow in relation to heat development of one of the lighting elements during operation.

Furthermore, the further adjusting element can comprise a further recess which separates the second cooling body section from the third cooling body section, wherein a size of the recess differs from a size of the further recess. The size of the recess can, for example, be adapted to the operating characteristics of the lighting means. If, for example, the heat development of one of the lighting means is greater, the associated recess, for example the further one, can be enlarged accordingly. Such an illumination device is characterized by high operational reliability and/or low production costs.

Furthermore, the illumination device can comprise a common cooling body, wherein the first cooling body section and the second cooling body section are part of the common cooling body. In addition, the third cooling body section can be part of the common cooling body. The illumination device can comprise further lighting elements which are connected to a corresponding cooling body section in a manner analogous to the first, second and third lighting elements, wherein a waste heat path connects the corresponding cooling body section to the heat sink, and wherein the illumination device comprises a further adjusting element for each further lighting element and is arranged between the corresponding cooling body section and an adjacent cooling body section. All cooling body sections can be part of the common cooling body. Furthermore, the common cooling body can be part of the heat sink and, according to further embodiments, can be the heat sink. For example, the cooling body sections can be part of the heat sink. Furthermore, the common cooling body can be connected to the heat sink. Advantageously, a compact design of the illumination device can be achieved.

Furthermore, the common cooling body can define an interior region in which the first lighting element and the second lighting element are arranged. The third lighting element and/or the further lighting elements can also be arranged in the interior region. Advantageously, a compact design is achieved while at the same time providing high operational reliability and/or efficient cooling.

In addition, the illumination device can comprise a controller which is configured to activate at least one of the lighting elements to preheat in a preheating mode in order to preheat another of the lighting elements to its operating temperature by means of its waste heat. The accuracy, precision and/or reliability of a light provision can be improved. It can be achieved that all provided lighting elements are always ready for use, and that light can be provided almost immediately within a substantially constant wavelength range.

In addition, the controller can be configured to prevent operation in a normal operating mode until the operating temperature is reached by preheating. Advantageously, it can be achieved that light within a constant wavelength range can be reliably provided. For example, an operating mode can be provided that has high accuracy and/or precision. This operating mode can be activated, in particular, as required.

Furthermore, the heat flow set by the adjusting element can be changed.

Advantageously, the heat flow can be adjusted as required. For example, if one of the lighting elements is preheated, a high heat flow can be advantageous. However, once an operating temperature has been reached, a lower heat flow can be sufficient to keep the lighting element at the operating temperature. Advantageously, the heat flow can be adjustable in this regard so that the operating temperature can be maintained. If, for example, exceeding a target temperature is detected, the heat flow can be reduced by the adjusting element. In addition, the heat flow adjusted by the adjusting element can depend on a temperature of the first cooling body section, the second cooling body section and/or the heat sink. This allows high efficiency and/or a compact design to be achieved.

In addition, the adjusting element can define at least one first setting state below a first temperature in which a larger heat flow is set, and above a second temperature can define at least one second setting state in which a smaller heat flow is set. In particular, the adjusting element can comprise a switching element. The switching element can be configured to switch automatically at a switching temperature. The switching can comprise a sudden switching between at least two different states, which result in heat flows of different magnitudes. In particular, the adjusting element can comprise a temperature switching element, for example a bimetallic element. Alternatively or additionally, the adjusting element can be designed to be switchable by external actuation. The adjusting element can in particular comprise a recess and a switching element. The switching element can be configured to bridge the recess in order to adjust a heat flow. For example, the switching element can bridge the recess in a first state and open it in a second state.

In addition, the adjusting element can comprise at least one heat pipe. The heat pipe can be a thermal pipe. In particular, the heat pipe is configured to generate a heat flow by using the evaporation enthalpy of a medium. The heat pipe preferably works passively. It can have an interior space through which a vapor stream that results from medium evaporated in the heating zone can flow from a heating zone to a cooling zone. The medium can condense in the cooling zone. Backflow to the heating zone can be due to capillary action. By providing the heat pipe, the heat flow can be enabled and/or adjusted in an efficient manner. In particular, efficient can mean that a high heat flow can be achieved in relation to the required installation space. Furthermore, by providing the heat pipe, the limit value for the conduction of thermal energy can be adjusted as required, in particular depending on the lighting means relative to each other.

Furthermore, the adjusting element can comprise at least one thermal bridge which can be selectively inserted between the first cooling body section and the second cooling body section. Setting states can be defined by the arrangement of the adjusting element. In particular, setting states can be continuously adjustable. For example, the adjusting element can bridge a recess. The adjusting element can encompass the recess.

The illumination device and/or imaging device according to the invention can be part of a medical system. The imaging device can, for example, be an endoscopic imaging device, specifically an endoscope device. Alternatively, the imaging device could be an exoscopic, a microscopic or a macroscopic imaging device. In particular, the imaging device can be a medical imaging device. The imaging device can be provided, for example, for examining a cavity.

The present invention is described below by way of example with reference to the accompanying figures. The drawings, the description, and the claims contain numerous features in combination. A person skilled in the art will also, expediently, consider the features individually and use them in combination as appropriate in the context of the claims.

If there is more than one example of a particular object, only one of them may be provided with a reference sign in the figures and in the description. The description of this example can be transferred accordingly to the other examples of the object. If objects are named using numerical words, such as first, second, third object, etc., these are used to name and/or assign objects. Accordingly, for example, a first object and a third object may be included, but not a second object. However, a number and/or sequence of objects could also be derived using numerical words.

Figure 1:
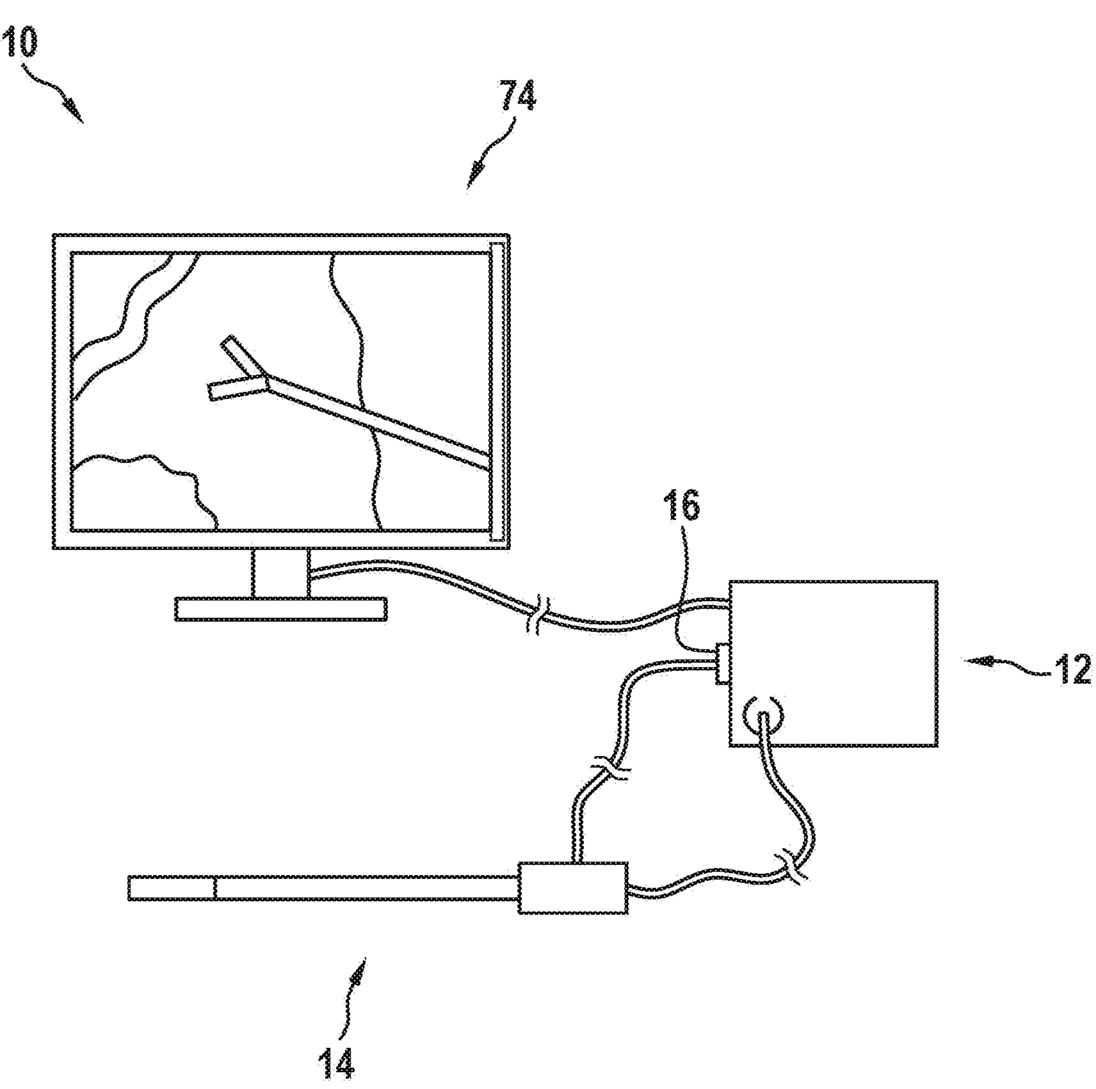
FIG. 1 shows a schematic representation of an imaging device having an illumination device.

FIG. 1 shows a schematic representation of an imaging device 10. In the instance shown by way of example, the imaging device 10 is an endoscopic imaging device, specifically an endoscope device. Alternatively, the imaging device 10 could be an exoscopic, a microscopic or a macroscopic imaging device. The imaging device 10 is shown by way of example as a medical imaging device. The imaging device 10 is provided, for example, for examining a cavity.

The imaging device 10 comprises a medical imaging instrument 14. In the shown case, this is an endoscope.

The imaging device 10 further comprises an illumination device 12 having an optical interface 16. The imaging instrument 14 can be optically connected to the optical interface 16. The optical interface 16 can be part of an optical-mechanical interface that can be optionally detachable and connectable. The imaging instrument 14 can optionally be decoupled from the illumination device 12. The illumination device 12 is configured to provide illumination light to the optical interface 16. In imaging by means of the imaging instrument 14, the illumination device 12 can accordingly provide the required illumination light, which is guided to the illumination instrument 14 and from there coupled out onto an object to be imaged, such as a situs.

In the illustrated case, the imaging device 10 further comprises a display unit 74 on which images can be displayed that are based on image data acquired by means of the imaging instrument 14. These can be video images, still images, overlays of different images, partial images, image sequences, etc.

The imaging device 10 is multimodal. By way of example, the imaging device can be operated in three basic modes: a multispectral mode, a fluorescence mode and a white light mode. It can further be provided for the imaging device 10 to be operable in a hyperspectral mode in addition or as an alternative to the multispectral mode.

The illumination device 12 is multimodal. The illumination device 12 is operable in different illumination modes in which it provides light for different imaging modes. Here, the illumination device 12 is operable in three basic modes, namely a multispectral mode, a fluorescence mode and a white light mode. The imaging instrument 14 can be operated in different operating modes, specifically also in at least a multispectral mode, a fluorescence mode and a white-light mode. In the corresponding operating mode of the imaging device 10, the modes of the illumination device 12 are matched to one another.

Figure 2:
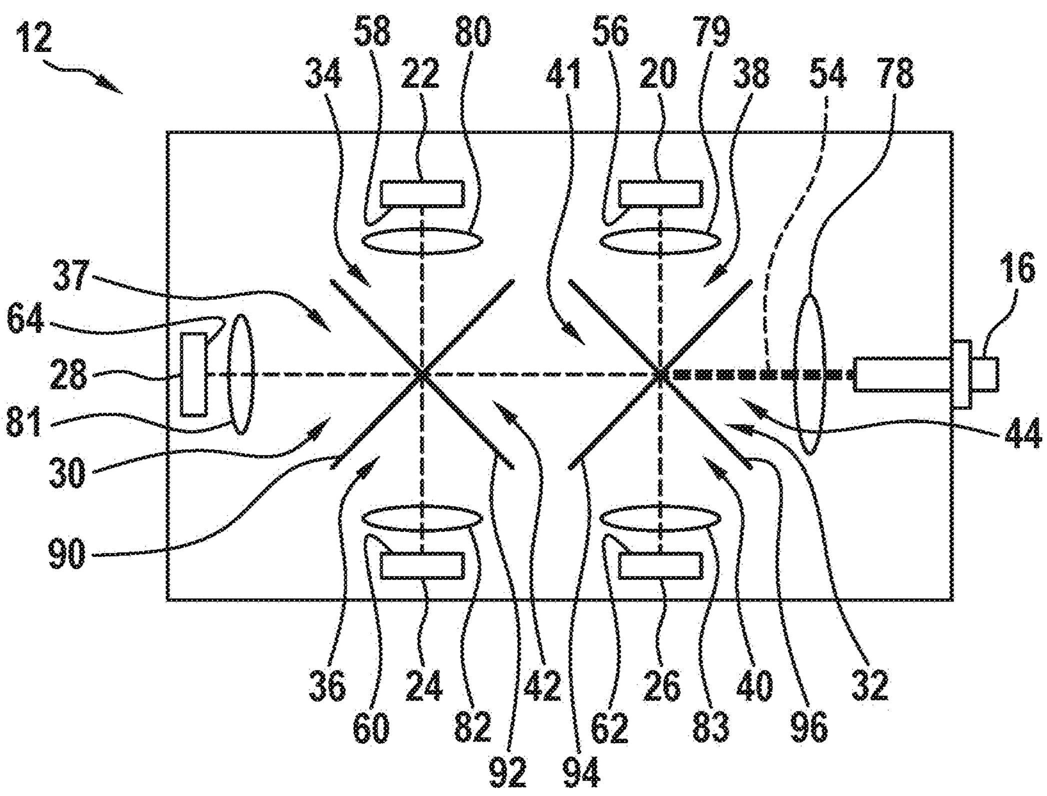
FIG. 2 shows a schematic representation of the illumination device.

FIG. 2 shows a schematic representation of the illumination device 12. The illumination device 12 comprises a plurality of independently activatable lighting elements 20, 22, 24, 26, 28. They are configured to emit light according to different emission spectra in order to provide illumination light, i.e. the relevant emission spectrum differs from lighting element to lighting element.

The lighting elements 20, 22, 24, 26, 28 are designed as LEDs, for example.

Specifically, a first lighting element 20 is configured as a red LED, a second lighting element 22 as a dark red LED, a third lighting element 24 as a blue LED and a fourth lighting element 26 as a near-IR LED. The colored lighting elements 20, 22, 24, 26 each emit in a narrow band, for example with an emission peak for example at wavelengths 660 nm (first lighting element 20), 770 nm (second lighting element 22), 460 nm (third lighting element 24) and 940 nm (fourth lighting element 26).

A fifth lighting element 28 is further provided, which in the present case is a white-light lighting element, for example a white-light LED. The fifth lighting element 28 emits, for example, in a spectral range of about 400 to 700 nm. In other embodiments, laser diodes can also be used, in particular as colored lighting elements.

Alternatively, a lighting element can be provided as the fifth lighting element 28 which emits illumination light in a part of the spectral range from 400 nm to 700 nm, in particular in a narrow-band part of the spectral range.

Depending on the illumination mode, some of the lighting elements 20, 22, 24, 26, 28 are activated at least temporarily, whereas other lighting elements 20, 22, 24, 26, 28 may not be used in the illumination mode in question.

In the present case, a first group comprises the first lighting element 20 and the fourth lighting element 26. The first group may additionally comprise lighting element 22 and/or lighting element 24. The first group is used for multispectral imaging, with the contained lighting elements 20, 26 and, if applicable, 22 and 24 each serving as support points. In multispectral mode, for example, the first ting element 20 is initially used for illumination and an image is taken. Then, the fourth ting element 26 is used for illumination and an image is taken. The images are based on remission, i.e. the light scattered back from the object being imaged is considered. The two different support points can be used to obtain spectral information about the object to be imaged. For example, certain tissue types, a perfusion state, a tissue condition or the like can be assessed in this way.

Furthermore, a second group comprises the first lighting element 20, the second lighting element 22 and the third lighting element 24. The second group is used for illumination in fluorescence imaging. For example, objects that have been colored with appropriately selected dyes can be viewed. Also, different dyes can be introduced into different types of tissue or the like, which are viewed simultaneously. By specifically exciting a particular dye, it is excited to fluoresce. The fluorescent light is then imaged. The first lighting element 20 is suitable, for example, for exciting the dye cyanine 5.5 (Cy 5.5). The second lighting element 22 is suitable for exciting the dye indocyanine green (ICG). The third lighting element 24 is suitable for exciting the dye fluorescein.

Furthermore, a third group comprises the fifth lighting element 28. In the present embodiment, the third group moreover comprises the first lighting element 20 and the third lighting element 24. The third group is used to provide illumination light for white-light imaging. For this purpose, white light from the fifth lighting element 28 can be mixed with light from certain colored lighting elements, whereby spectral losses can be compensated and/or a color temperature can be specifically adjusted.

It can be seen that some of the lighting elements 20, 22, 24, 26, 28 are assigned to a plurality of groups, for example the first lighting element 20 to all three groups and the third lighting element 24 and possibly also the second lighting element 22 to the second group and third group.

Alternatively or additionally, it may also be provided for some or all of the lighting elements 20, 22, 24, 26, 28 to be used in a hyperspectral mode. A broad spectrum of excitation is then generated. In combination with a suitable hyperspectral detector, spectral information about the object to be imaged can then be captured across the entire visible and near-IR spectrum. For this purpose, the imaging instrument 14 can comprise a pushbroom arrangement as a hyperspectral detector. In other embodiments, a whiskbroom arrangement, a staring arrangement and/or a snapshot arrangement is used. The imaging instrument 14 can be a hyperspectral imaging instrument. Regarding different methods of hyperspectral imaging and components required for this, reference is made to the article "Review of spectral imaging technology in biomedical engineering: achievements and challenges" by Quingli Li et al., published in Journal of Biomedical Optics 18(10), 100901, October 2013, and to the article "Medical hyperspectral imaging: a review" by Guolan Lu and Baowei Fei, published in Journal of Biomedical Optics 19(1), 010901, January 2014.

The illumination device 12 comprises two beam combiners 30, 32. In connection with FIG. 1 to, the function of the beam combiners 30, 32 is generally described. Embodiments of the beam combiners are described in more detail in the following figures. It is understood that the beam combiners 30, 32 can be replaced by the beam combiners described below. The beam combiners 30, 32 each comprise an output side 42, 44, an input side 37, 41 opposite the output side 42, 44 and two input sides 34, 36, 38, 40 opposite one another. All input sides 34, 36, 37, 38, 40, 41 guide incident illumination light at least partially to the corresponding output side 42, 44. The output side 42 of a first beam combiner 30 faces an input side 41 of the second beam combiner 32. The output side 44 of the second beam combiner 32 faces the optical interface 16. The two beam combiners 30, 32 are preferably arranged coaxially to one another and/or to the optical interface.

The illumination device 12 can comprise suitable optical elements such as lenses and/or mirrors (not shown). A plurality of lenses 78, 79, 80, 81, 82, 83 is shown by way of example in FIG. 2. A lens 78 is assigned, for example, to the optical interface 16 and couples light coming from the output side 44 of the second beam combiner 32 into the optical interface 16. Furthermore, each of the lighting elements 20, 22, 24, 26, 28 can be assigned a lens 79, 80, 81, 82, 83. A particularly high degree of compactness can be achieved in particular if the lighting elements 20, 22, 24, 26, 28 are each arranged without an intermediate mirror on input sides 34, 36, 37, 38, 40 of the at least one beam combiner 30, 32.

The lighting elements 20, 22, 24, 26, 28 can then be moved very close to the at least one crossed beam splitter 30, 32.

Figure 3:
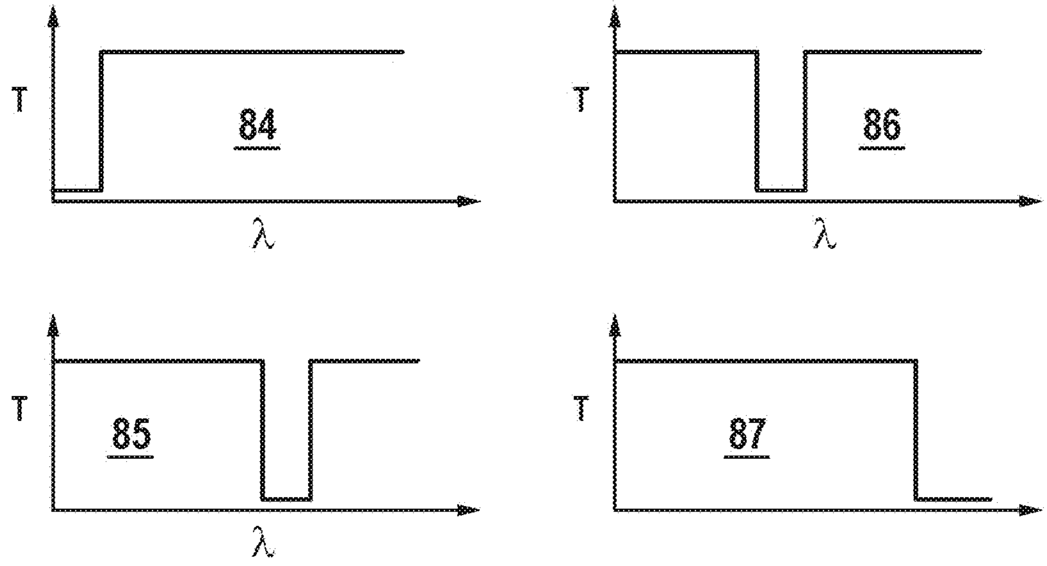
FIG. 3 shows schematic transmission curves of mirrors of the illumination device.

The beam combiners 30, 32 each comprise two mirrors 90, 92, 94, 96. They can basically be partially transmitting, so that illumination light from all input sides 34, 36, 37, 38, 40, 41 is redirected to the relevant output side 42, 44. In the present embodiment, the mirrors 90, 92, 94, 96 are selectively light-transmissive. This is illustrated with further reference to FIG. 3. The mirrors 90, 92, 94, 96 can be filters that reflect only within a defined range, but otherwise have high transmission. FIG. 3 shows transmission curves 84, 85, 86, 87 of the mirrors 90, 92, 94, 96 of the two beam combiners 30, 32. Each of the colored lighting elements 20, 22, 24, 26 or each of the opposite input sides 34, 36, 38, 40 is assigned one of the mirrors 90, 92, 94, 96. The mirrors 90, 92, 94, 96 are selected in such a way that they each reflect in the wavelength range in which the associated lighting element 20, 22, 24, 26 emits, but also largely transmit. For this purpose, notch filters in the medium wavelength range can be used, which can have, for example, transmission spectra 85 and 86. At spectral edges, high-pass or low-pass filters can be used instead of notch filters (see transmission spectra 84 and 87).

Due to the specific transmission spectra 84, 85, 86 and 87 of the beam combiners 30, 32, illumination light from the fifth lighting element 28 is spectrally clipped. It can therefore be expedient to supplement the illumination light blocked by the beam combiners 30, 32 in a targeted manner by means of the lighting elements 20 and 24, if necessary also 22 and/or 26. This allows the illumination light to be supplemented specifically in those spectral ranges in which the beam combiners 30, 32 absorb and/or reflect illumination light from the fifth lighting element 28, but in any case do not transmit it to the optical interface 16. The additionally used lighting elements 20, 24 and, if applicable, 22 are preferably operated with reduced power or with adjusted power. The aim here may be to at least largely restore the original spectrum of the fifth lighting element 28.

In some embodiments, the fifth lighting element 28 can alternatively be a green lighting element or, more generally, a colored lighting element that emits primarily in the spectral range that the at least one beam combiner 30, 32 transmits. For example, in such embodiments, the fifth lighting element 26 may be an LED having an emission peak at about 530 nm. A green laser diode can also be used for this purpose. Here, it can be provided that color mixing takes place in white-light mode and, in particular, that no individual white-light source such as a white-light LED is used, but that white light from separate lighting elements is specifically mixed.

It shall be understood that in case of suitable dyes, such a green lighting element can also be used in fluorescence mode. Alternatively or additionally, it could be used in multispectral mode.

The illumination device 12 defines a common optical path 54 into which emitted light from the lighting elements 20, 22, 24, 26, 28 can be coupled. The common optical path 54 extends from the output side 44 of the second beam combiner 32 to the optical interface 16. In the present case, the common optical path 54 is arranged coaxially with the fifth lighting element 26.

In the embodiment shown, the lighting elements 20, 26 of the first group are arranged in such a way that illumination light emitted by the lighting elements 20, 26 travels through a light path of at least substantially the same length from the relevant lighting element 20, 26 to the optical interface 16. The lighting elements 20, 26 of the first group each have a light-emitting surface 56, 58. The light-emitting surfaces 56, 62 are arranged equidistantly with respect to the common optical path 54. In the present case, this is achieved in that the two lighting elements 20, 26 are arranged at the same distance from the beam combiner 32 assigned to them (in the present case, by way of example, the second beam combiner 32), in particular from its opposite input sides 38, 40. The light is coupled by the beam combiner 32 into the common optical path 54.

The beam combiners 30, 32 are in particular arranged in such a way that light-emitting surfaces 56, 58, 60, 62, 64 of the lighting elements 20, 22, 24, 26, 28 are each arranged equidistantly with respect to their associated beam combiner 30, 32.

By using beam combiners 30, 32 and lighting elements 20, 22, 24, 26, 28 that can be used together for different modes, the illumination device 12 has a high degree of compactness. In addition, the equidistant arrangement ensures that no spectral shifts occur when the imaging instrument 14 or its light guide is rotated relative to the optical interface 16.

It shall be understood that a different number of lighting elements 20, 22, 24, 26, 28 and/or a different number of beam combiners 30, 32 can be used.

Figure 4:
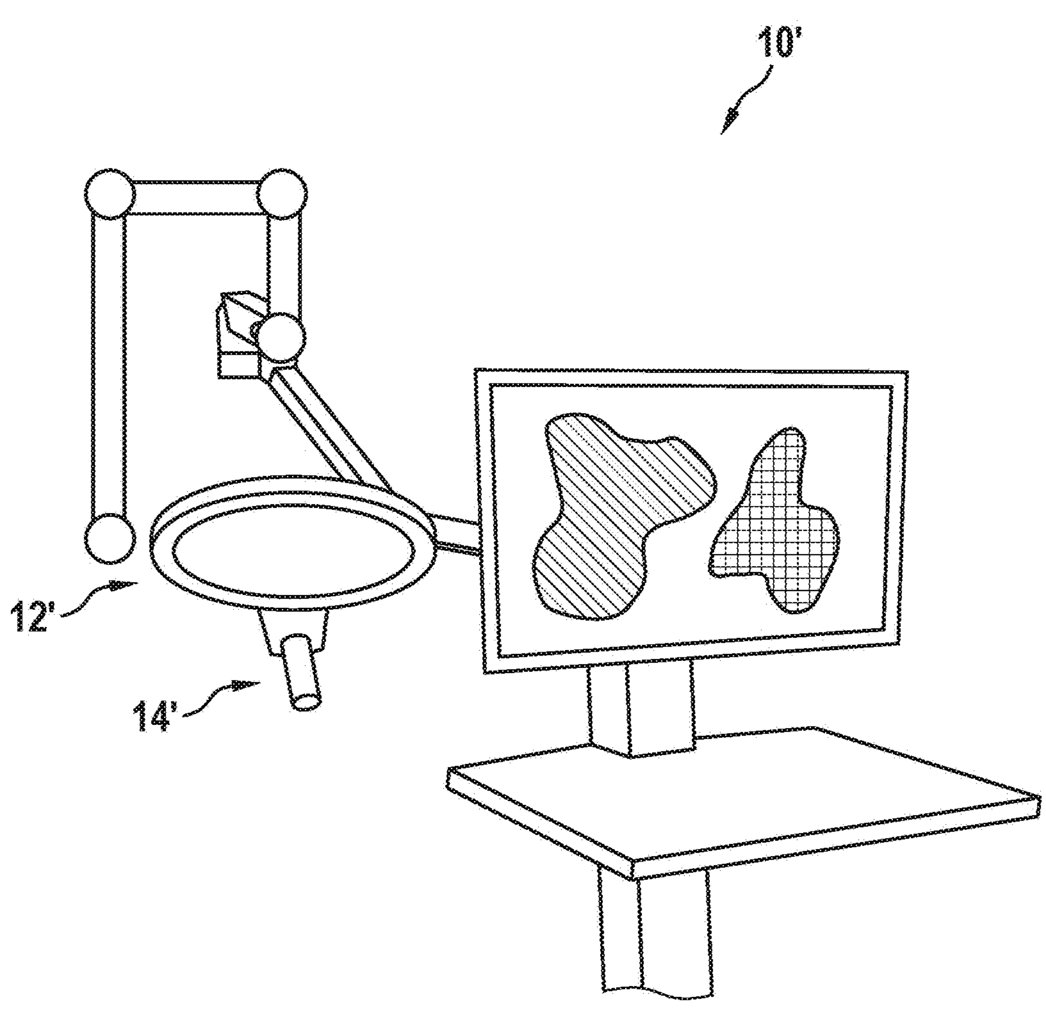
FIG. 4 shows a schematic perspective representation of another embodiment of the imaging device.

FIG. 4 shows a schematic perspective representation of another embodiment of an imaging device 10'. The reference signs of this embodiment are provided with inverted commas for differentiation purposes. In this embodiment, the imaging device 10' is designed as an exoscopic imaging device. It comprises an illumination device 12' and an imaging instrument 14'. Its basic functionality corresponds to that described above, but in this embodiment the imaging instrument 14' is designed as an exoscope.

Figure 5:
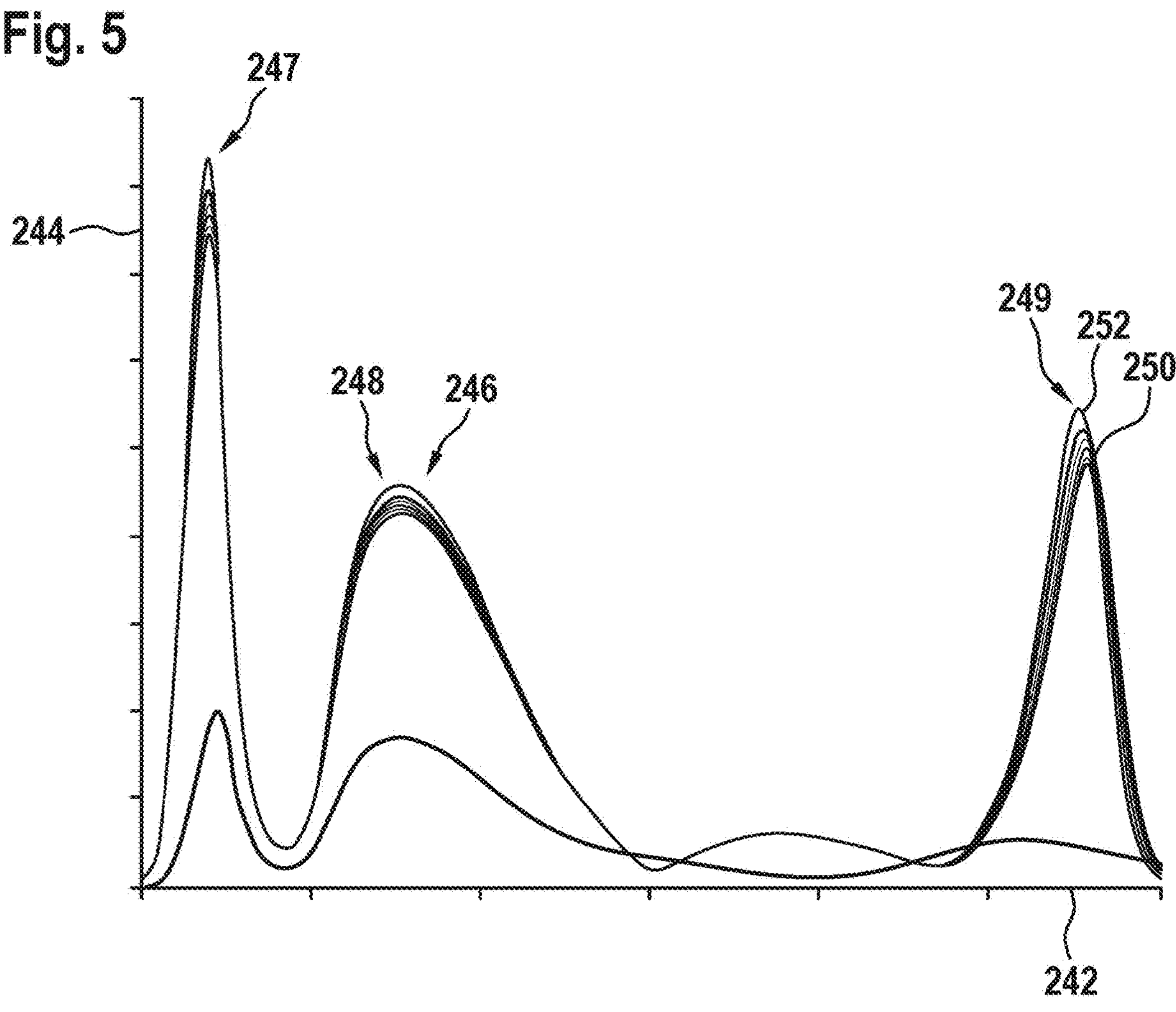
FIG. 5 shows a schematic representation of spectral power distributions of an imaging device as a function of an operating duration of lighting elements of the imaging device.

FIG. 5 schematically illustrates a shift of an emitted wavelength range during operation of an illumination device. On the abscissa 242 is plotted the wavelength in nanometers (nm), and on the ordinate 244 the irradiance in watts per square meter per nanometer ($W/m^2/nm$). A plurality of partially overlapping curves 246 can be seen, each of which represents a spectral power distribution after different operating durations of the illumination device at the same operating power. The spectral power distribution shows three local maxima 247, 248, 249. Each local maximum 247, 248, 249 corresponds to a maximum irradiance of a lighting element of the illumination device, each of which is assigned to a peak wavelength. In particular, referring to the local maximum 249, which is associated with the largest peak wavelength of the three local maxima 247, 248, 249, it can be seen that the peak wavelength shifts to a higher peak wavelength depending on the operating duration. For example, the local maximum 249 of the spectral power distribution after 300 seconds of operation (curve 250) increases by 8 nm compared to the spectral power distribution after 0 s of operation (curve 252). According to this example, the emitted wavelength range has shifted by about 8 nm to a higher wavelength range after 300 s.

Figure 6:
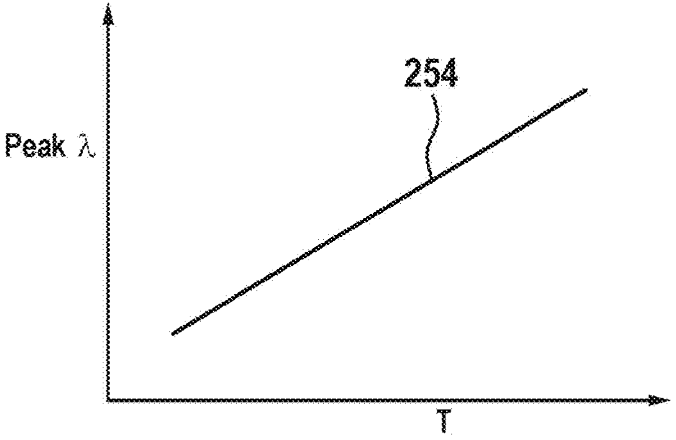
FIG. 6 shows a schematic relationship between a peak wavelength and a temperature of a lighting element.

This behavior is at least partly due to the fact that the lighting elements of the illumination device heat up during operation. This situation is illustrated again in FIG. 6. FIG. 6 shows the dependence 254 of a peak wavelength on a temperature of a lighting element. It can be seen that the peak wavelength increases linearly depending on the temperature of the lighting element. The ratio between peak wavelength and temperature should only be understood as an example. There can also be a non-linear relationship. In particular, the ratio is specific to the lighting element.

The fact that the emitted wavelength range shifts depending on the temperature of a lighting element can cause difficulties, in particular when performing hyper- and/or multispectral imaging.

The following figures show a plurality of embodiments of illumination devices. These can be provided in any manner for operation with the imaging device 10 of FIGS. 1-6. In particular, the illumination devices shown in the following figures can be developments of the illumination device 12. The first digit of each of the utilized reference symbols can in particular be assigned to an embodiment, while the other two digits can be assigned to an object. For example, reference sign 104 can be assigned to a heat sink of a first embodiment and 204 to a heat sink of a second embodiment.

With regard to the utilized optical elements, reference is made below to the imaging device 10 and/or illumination device 12 described in FIGS. 1-6. For example, the illumination devices described below comprise beam combiners 30, 32 and lenses 78, 79, 80, 81, 82, 83 according to FIG. 2.

Figure 7:
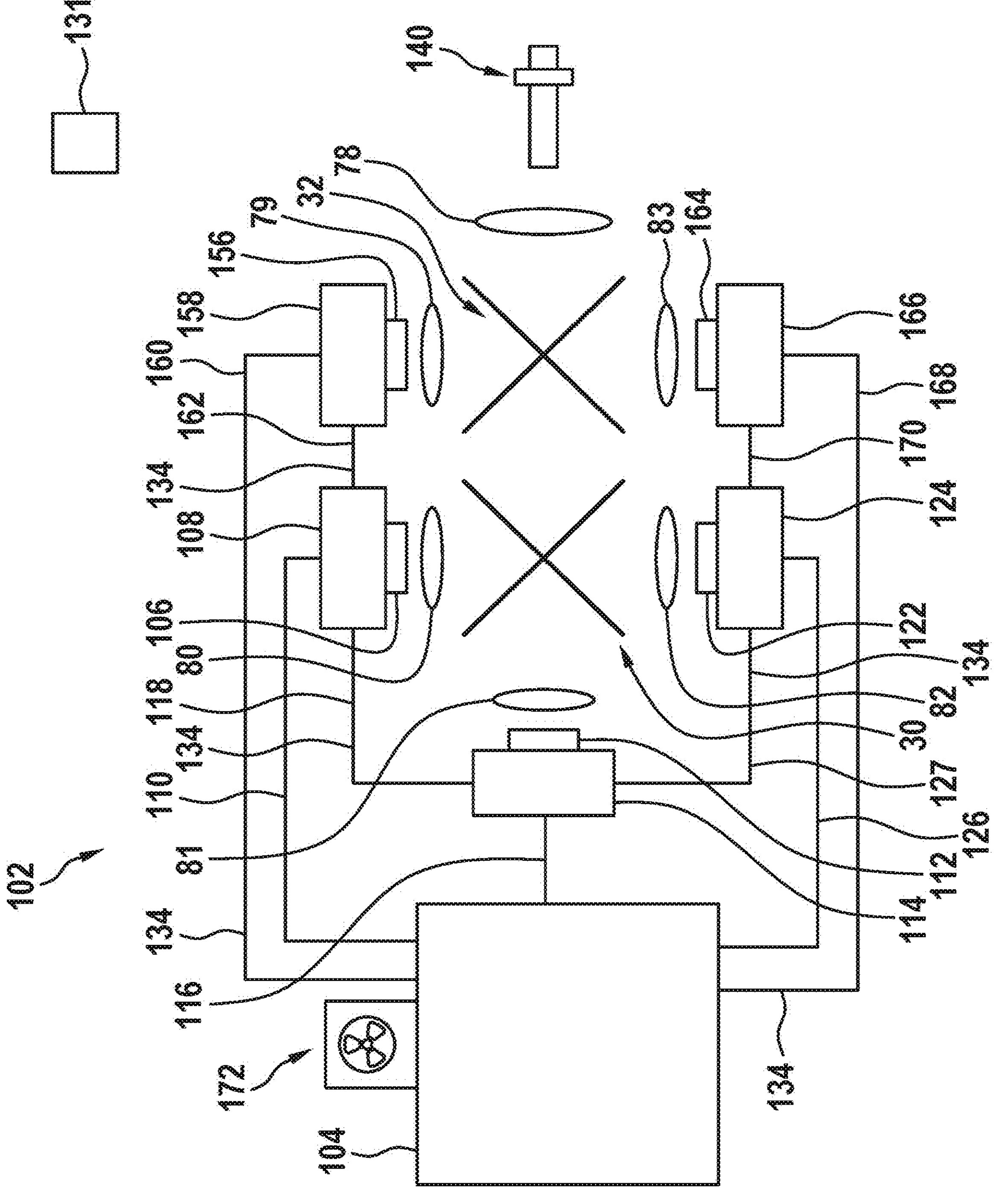
FIG. 7 shows a further embodiment of an illumination device comprising heat pipes.

FIG. 7 shows an illumination device 102 comprising a heat sink 104, a fan 172, a controller 131 and an optical interface 140. Merely by way of example, the beam combiners 30, 32 and lenses 78, 79, 80, 81, 82, 83 are mentioned again with reference to FIG. 2, which are also included in the illumination device 102. Furthermore, the illumination device 102 comprises a first lighting element 106 and a first cooling body section 108. The first cooling body section 108 is thermally coupled to the first lighting element 106 and is configured to absorb waste heat from the first lighting element 106. A first waste heat path 110 thermally connects the first cooling body section 108 to the heat sink 104 so that the waste heat of the first lighting element 106 can be dissipated via the first waste heat path 110. According to this embodiment, the first waste heat path 110 comprises a heat pipe 134. For the sake of easy recognition, all heat pipes are provided with the reference sign 134 below. However, it is understood that these can be different components. In addition, the illumination device 102 comprises a second lighting element 112 and a second cooling body section 114. The second cooling body section 114 is thermally coupled to the second lighting element 112 and is configured to absorb waste heat from the second lighting element 112. A second waste heat path 116 thermally connects the second cooling body section 114 to the heat sink 104 so that the waste heat of the second lighting element 112 can be dissipated via the second waste heat path 116. An adjusting element 118 is arranged between the first cooling body section 108 and the second cooling body section 114. The adjusting element 118 is configured to adjust a heat flow from the first cooling body section 108 to the second cooling body section 114. This can also mean that the adjusting element 118 is configured to adjust a heat flow from the second cooling body section 114 to the first cooling body section 108. It is understood that heat is generally conducted from a warmer section to a colder section. According to this embodiment, the adjusting element 118 comprises a heat pipe 134. By a suitable selection of the heat pipe 134 between the first cooling body section 108 and the second cooling body section 114, the heat flow can be adjustable. Furthermore, by a suitable selection of the heat pipe 134 between the first cooling body section 108 and the heat sink 104 or between the second cooling body section 114 and the heat sink 104, for example by selecting a suitable working medium of the heat pipe 134, the dissipation of the waste heat can be adjusted, in particular relative to the heat flow between the first cooling body section 108 and the second cooling body section 114. This makes it possible, for example, to adjust a temperature of the first cooling body section 108 or of the first lighting element 106 by operating the second lighting element 112.

The illumination device 102 also includes a third lighting element 122 and a third cooling body section 124. The third cooling body section 124 is thermally coupled to the third lighting element 122 and is configured to absorb waste heat from the third lighting element 122. A third waste heat path 126 thermally connects the third cooling body section 124 to the heat sink 104 so that the waste heat of the third lighting element 122 can be dissipated via the third waste heat path 126. The third waste heat path 126 comprises a heat pipe 134. A further adjusting element 127 is arranged between the second cooling body section 114 and the third cooling body section 124. The further adjusting element 127 is configured to adjust a heat flow from the second cooling body section 114 to the third cooling body section 124 in such a way that it differs from the heat flow between the first cooling body section 108 and the second cooling body section 114. In particular, the heat flow through the further adjusting element 127 can be adjusted specific to the lighting element. For example, the third lighting element 122 can have an optimal operating temperature different from the first lighting element 106. At the optimal operating temperature, the lighting elements 106, 112, 122 emit light in a desired, in particular application-specific, spectral range and/or with a desired, in particular application-specific, peak wavelength. The further adjusting element 127 also comprises a heat pipe 134. According to this embodiment, the heat flow is adjustable by the appropriate choice of the heat pipe between the second cooling body section 114 and the third cooling body section 124.

The illumination device 102 also includes a fourth lighting element 156 and a fourth cooling body section 158. The fourth cooling body section 158 is thermally coupled to the fourth lighting element 156 and is configured to absorb waste heat from the fourth lighting element 156. A fourth waste heat path 160 thermally connects the fourth cooling body section 158 to the heat sink 104, so that the waste heat of the fourth lighting element 156 can be dissipated via the fourth waste heat path 160. The fourth waste heat path 160 comprises a heat pipe 134. A further adjusting element 162, which comprises a heat pipe 134, is arranged between the first cooling body section 108 and the fourth cooling body section 158. The further adjusting element 162 is configured to adjust a heat flow from the first cooling body section 108 to the fourth cooling body section 158 in such a way that it differs from the heat flow between the remaining cooling body sections 108, 114, 124.

The illumination device 102 also includes a fifth lighting element 164 and a fifth cooling body section 166. The fifth cooling body section 166 is thermally coupled to the fifth lighting element 164 and configured to absorb waste heat from the fifth lighting element 164. A fifth waste heat path 168 thermally connects the fifth cooling body section 166 to the heat sink 104 so that the waste heat of the fifth lighting element 164 can be dissipated via the fifth waste heat path 168. The fifth waste heat path 168 comprises a heat pipe 134. A further adjusting element 170, which comprises a heat pipe 134, is arranged between the third cooling body section 124 and the fifth cooling body section 166. The further adjusting element 170 is configured to adjust a heat flow from the third cooling body section 124 to the fifth cooling body section 166 in such a way that it differs from the heat flow between the remaining cooling body sections 108, 114, 124, 158.

The controller 131 is configured to control the lighting elements 106, 112, 122, 156, 164. Furthermore, the controller 131 is configured to control the fan 172. The fan 172 is arranged in close proximity to the heat sink 104. In particular, the fan 172 improves and/or influences heat transfer by convection. In addition, the controller 131 can be configured to regulate the fan 172 and/or the heat transfer by convection by controlling the fan 172. In particular, the controller 131 is configured to activate at least one of the lighting elements 106, 112, 122, 156, 164 for preheating in a preheating mode in order to preheat at least another of the lighting elements 106, 112, 122, 156, 164 to its operating temperature by means of its waste heat. In the preheating mode, at least one of the lighting elements 106, 112, 122, 156, 164 can also individually preheat a plurality of the lighting elements 106, 112, 122, 156, 164 to their operating temperature. In particular, the adjusting elements 118, 127, 162, 170 are coordinated with each other and/or with the controller 131 in such a way that each of the lighting elements 106, 112, 122, 156, 164 can be individually preheated to its operating temperature. Furthermore, the controller 131 is configured to prevent operation in a normal operating mode until the operating temperature is reached by preheating. For example, the operation of each of the lighting elements 106, 112, 122, 156, 164 can be prevented until the operating temperature is reached. It can also be provided that one of the lighting elements 106, 112, 122, 156, 164 reacts more strongly to a temperature change with respect to the emitted spectrum. The operation of the illumination apparatus 102 can be prevented until the operating temperature of this lighting element 106, 112, 122, 156, 164 is reached by preheating.

Furthermore, the controller 131 can control a cooling capacity of the fan 172 as needed in such a way that the heat sink 104 and/or the cooling body sections 108, 114, 124, 158, 166 can be cooled as needed. For example, if a temperature of the heat sink 104 exceeds a limit temperature, the cooling capacity of the fan 172 can be increased.

It is understood that, according to embodiments (not shown), only two lighting elements, in particular the first lighting element 108 and the second lighting element 112, can be provided.

Figure 8:
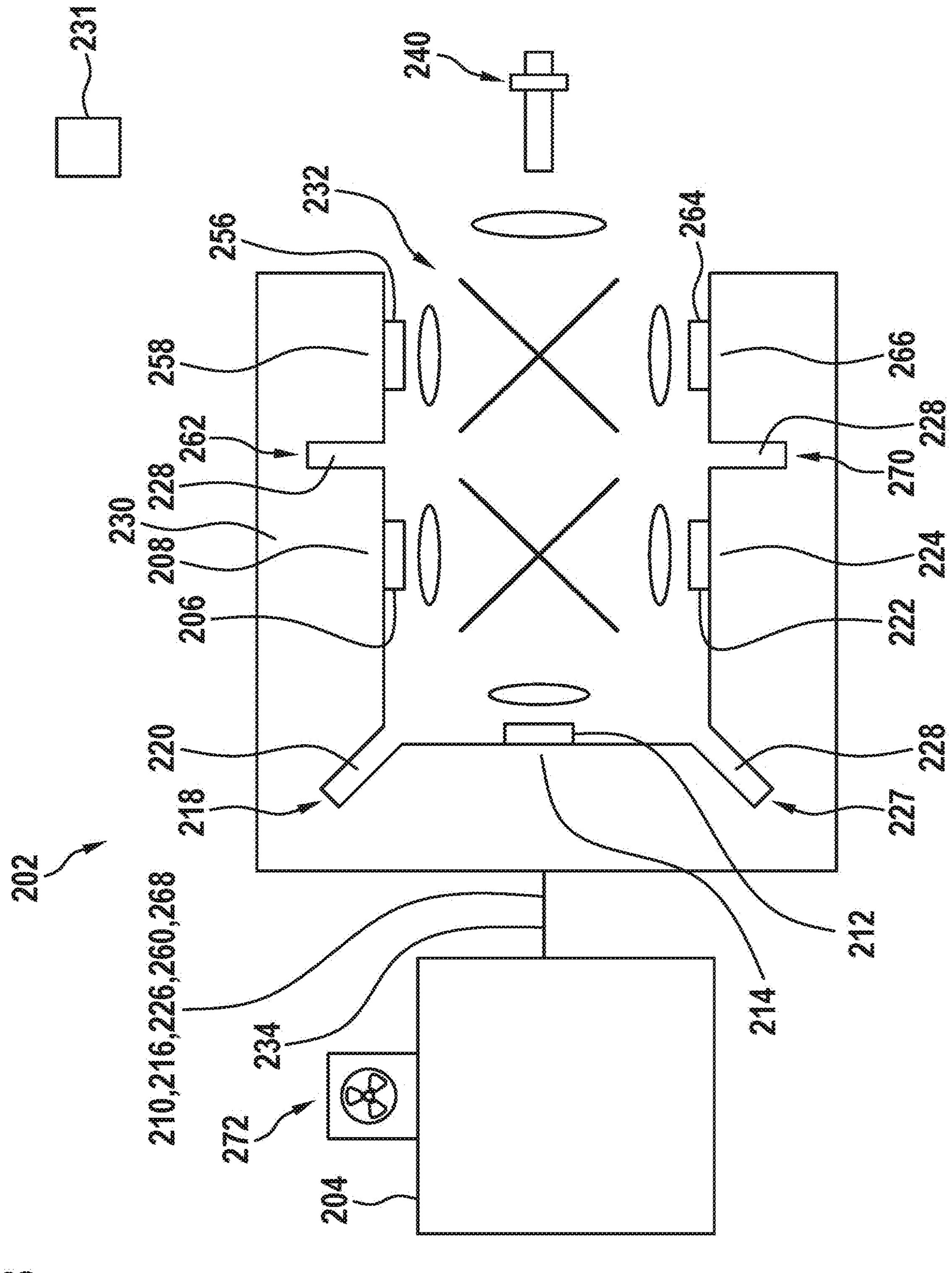
FIG. 8 shows a further embodiment of an illumination device comprising recesses.

FIG. 8 shows a further embodiment of an illumination device 202, wherein the illumination device 202 comprises a common cooling body 230. The illumination device 202 has similar features to the illumination device 102. Likewise, the illumination device 202 comprises five lighting elements 206, 212, 222, 256, 264 and five cooling body sections 208, 214, 224, 258, 266, which are thermally coupled, as described in connection with FIG. 7, to one of the five lighting elements 206, 212, 222, 256, 264 and are configured to absorb waste heat from the corresponding lighting element 206, 212, 222, 256, 264. The cooling body sections 208, 214, 224, 258, 266 are integrally formed. In particular, the cooling body sections 208, 214, 224, 258, 266 are part of the common cooling body 230. In contrast to the embodiment shown in FIG. 7, the illumination device 202 comprises adjusting elements 218, 227, 262, 270, each comprising a recess 220, 228 which separates the cooling body sections 208, 214, 224, 258, 266 from one another. In particular, the cooling body sections 208, 214, 224, 258, 266 can be thermally decoupled from one another. In this respect, the size of the recess 220, 228 can be relevant. This can be provided in such a way that the cooling body sections 208, 214, 224, 258, 266 are thermally decoupled.

The common cooling body 230 defines an interior region 232 in which the lighting elements 206, 212, 222, 256, 264 are arranged. Furthermore, the optical elements described in the previous embodiments are arranged in the inner region 232.

For each cooling body section 208, 214, 224, 258, 266, the illumination device 202 comprises a waste heat path 210, 216, 226, 260, 268, which thermally connects the corresponding cooling body section 208, 214, 224, 258, 266 to the heat sink 204 so that the waste heat of the lighting elements 206, 212, 222, 256, 264 can be dissipated via the waste heat paths 210, 216, 226, 260, 268. The waste heat paths 210, 216, 226, 260, 268 extend at least partially along the common cooling body 230. The common cooling body 230 is thermally connected to the heat sink 204 by means of a heat pipe 234. The waste heat paths 210, 216, 226, 260, 268 therefore extend along the heat pipe 234 to the heat sink 204.

Furthermore, the illumination device 202 comprises a fan 272, an optical interface 240, and a controller 231. Regarding the features of the controller 231 of the fan 272, reference is made to the embodiment according to FIG. 7. The features mentioned therein can be transferred analogously to the embodiment according to FIG. 8.

Figure 9:
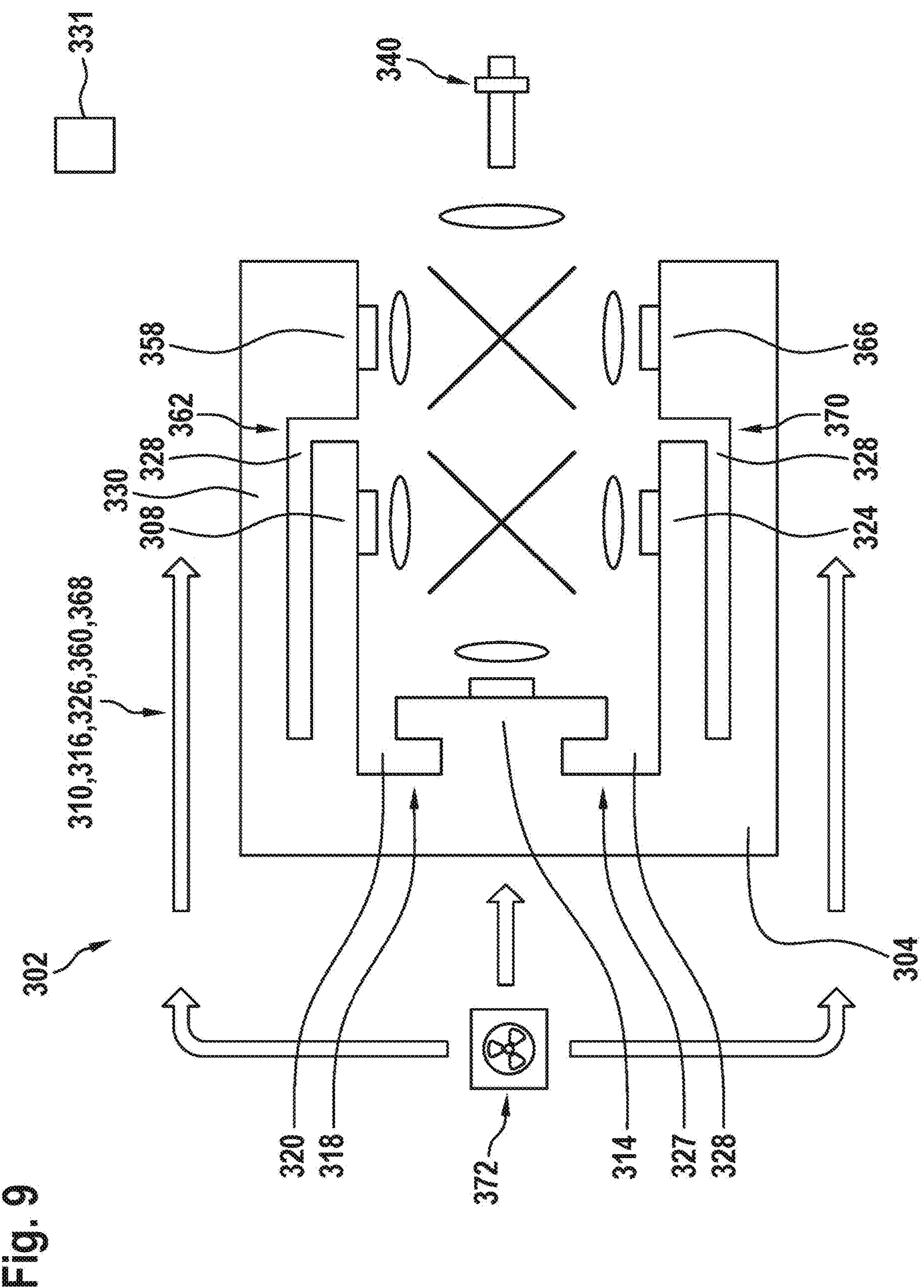
FIG. 9 shows a further embodiment of an illumination device comprising thermally largely decoupled cooling body sections.

FIG. 9 shows a further embodiment of an illumination device 302'. The illumination device 302 is in particular similar to the illumination device 202 and also has an optical interface 340. With regard to features not described in detail below, reference is made to the description in connection with FIG. 8. In contrast, the illumination device 302 comprises a heat sink 304 that is integrally formed with a common cooling body 330. Consequently, waste heat paths 310, 316, 326, 360, 368 extend along the common cooling body 330. By means of a fan 372, which, as already explained, is controlled by a controller 331, a cooling capacity of the common cooling body 330 can be adjusted, in particular by convection. Furthermore, it can be seen that adjusting elements 318, 327, 362, 370, which in particular comprise recesses 320, 328, differ in their size. By providing larger recesses 320, 328 compared to the recesses 220, 228 of FIG. 8, the heat flow adjusted by the adjusting elements 318, 327, 362, 370 can be changed. According to the embodiment in FIG. 9, the cooling body sections 308, 314, 324, 358, 366 are largely thermally decoupled from one another.

Figure 10:
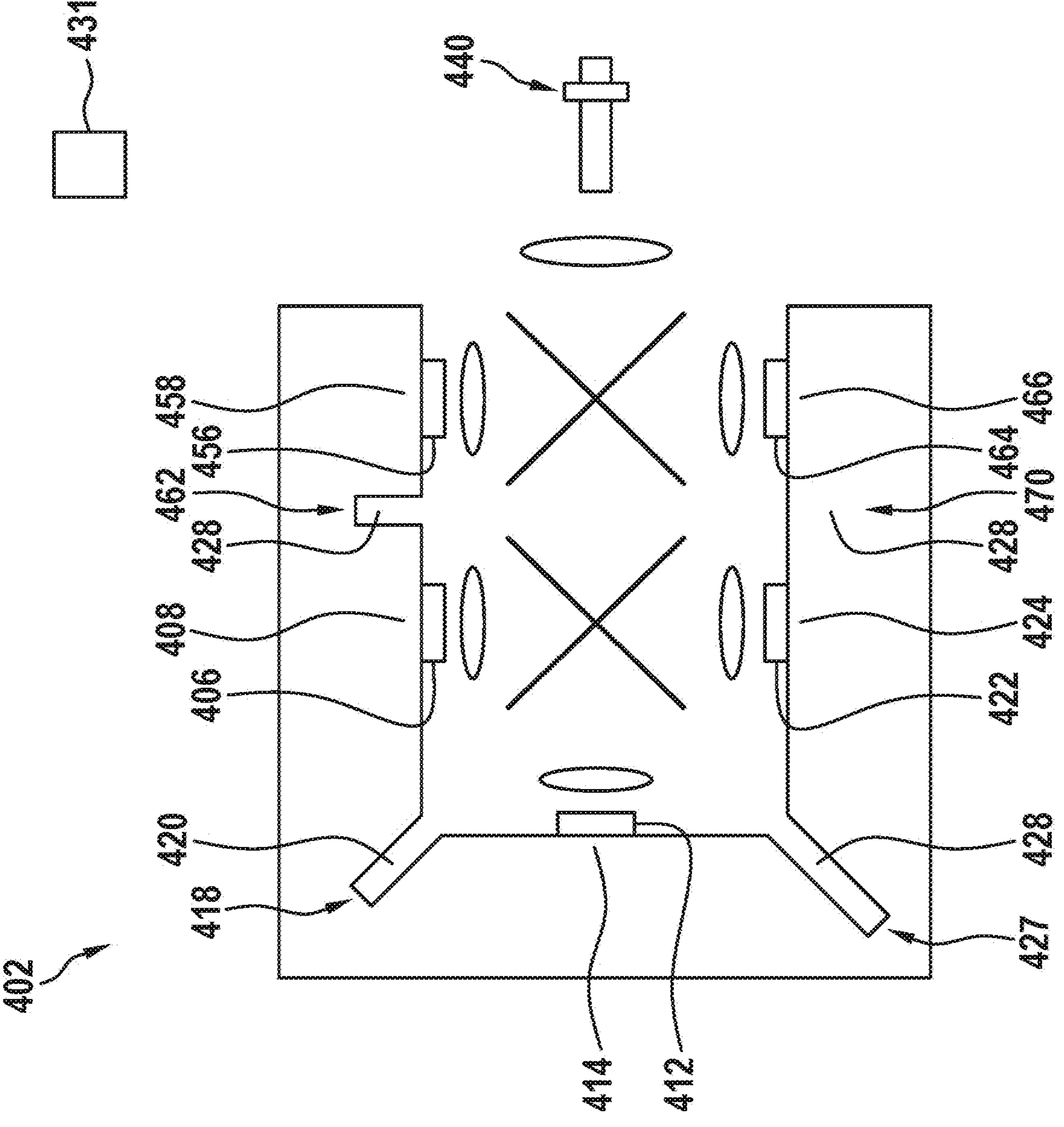
FIG. 10 shows a further embodiment of an illumination device comprising recesses of different sizes.

FIG. 10 shows another embodiment of an illumination device 402 which in many features is similar to the illumination devices 202, 302. The illumination device 402 has an optical unit 440. In contrast to the previous illumination devices 202, 302, no fan 172 is provided. In general, the provision of a fan 172 is optional. Even in the embodiments shown so far, a fan 172 is not necessarily necessary. It can be seen in FIG. 10 that adjusting elements 418, 427, 462, 470, which in particular comprise recesses 420, 428, differ in their size. For example, a size of the recess 420 that separates the first cooling body section 408 from the second cooling body section 414 differs from a size of the further recess 428 that separates the second cooling body section 414 from the third cooling body section 424. Each recess 420, 428 can have a size individually adapted to the five lighting elements 406, 412, 422, 456, 464 and/or cooling body sections 408, 414, 424, 458, 466. For example, the size of one of the recesses 420, 428 can be provided in such a way that the heat flow between two cooling body sections cannot be influenced or can only be influenced minimally. For example, it can be seen in FIG. 10 that the further recess 428 that separates the third cooling body section 424 from the fifth cooling body section 466 is minimal, or the further recess 428 is not present.

Figure 11:
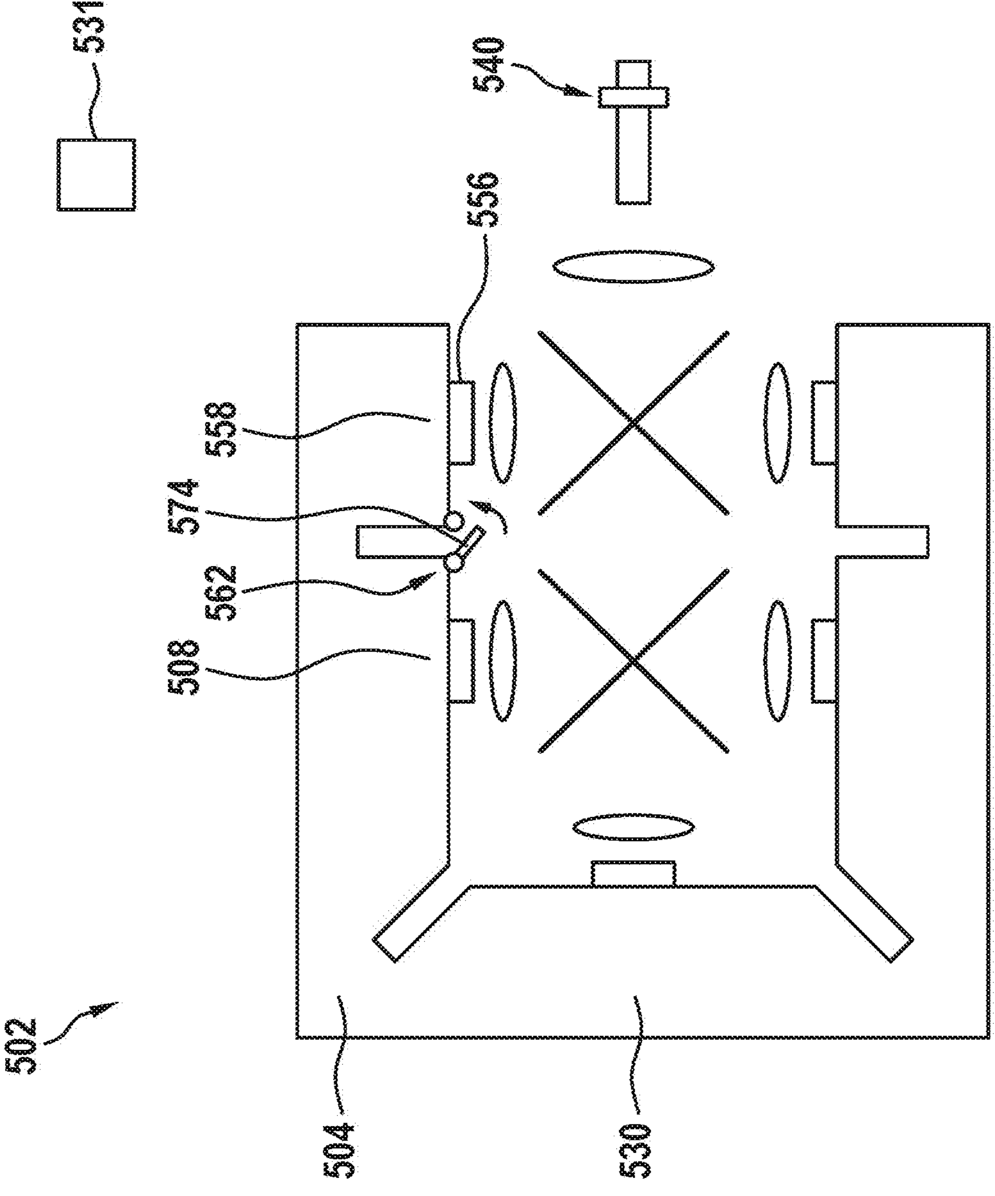
FIG. 11 shows a further embodiment of an illumination device comprising a switching element.

With regard to the embodiment of an illumination device 502 with an optical interface 540 shown in FIG. 11, reference is made in particular to FIG. 8. The embodiment in FIG. 11 is different in that a heat sink 504 is formed integrally with a common cooling body 530 as described with respect to the embodiment in FIG. 10. In addition, the illumination device 502 includes another feature. An adjusting element 562 which includes a switching element 574 is arranged between the fourth cooling body section 558 and the first cooling body section 508. The heat flow adjusted by the adjusting element 562 can be changed by means of the adjusting element 562. In addition, the heat flow adjusted by the adjusting element 562 can depend on a temperature of the first cooling body section 508, of the fourth cooling body section 558 and/or of the heat sink 504. In addition, the adjusting element 562 can define at least one first adjusted state below a first temperature in which a larger heat flow is adjusted, and above a second temperature can define at least one second adjusted state in which a smaller heat flow is adjusted. For example, if the first cooling body section 508 reaches the second temperature, the adjusting element 562, in particular the switching element 574, switches to the second adjusted state, whereby a smaller heat flow can be adjusted. The first temperature and/or the second temperature can be defined, for example, as a switching temperature. The switching element 574 is configured to switch automatically at the switching temperature. This is achieved in that, according to this embodiment, the switching element 574 comprises a temperature switching element, in particular a bimetallic element.

Alternatively or additionally, the adjusting element 562 can be designed to be switchable by external actuation (not shown). The controller 531 can be configured to switch the adjusting element 562. In particular, the controller 531 can be configured to switch the adjusting element 562 upon a switching temperature being reached, wherein the switching temperature is suitable for changing a heat flow in such a way that, for example, a fourth lighting element 556 reaches and/or maintains an operating temperature.

Figure 12:
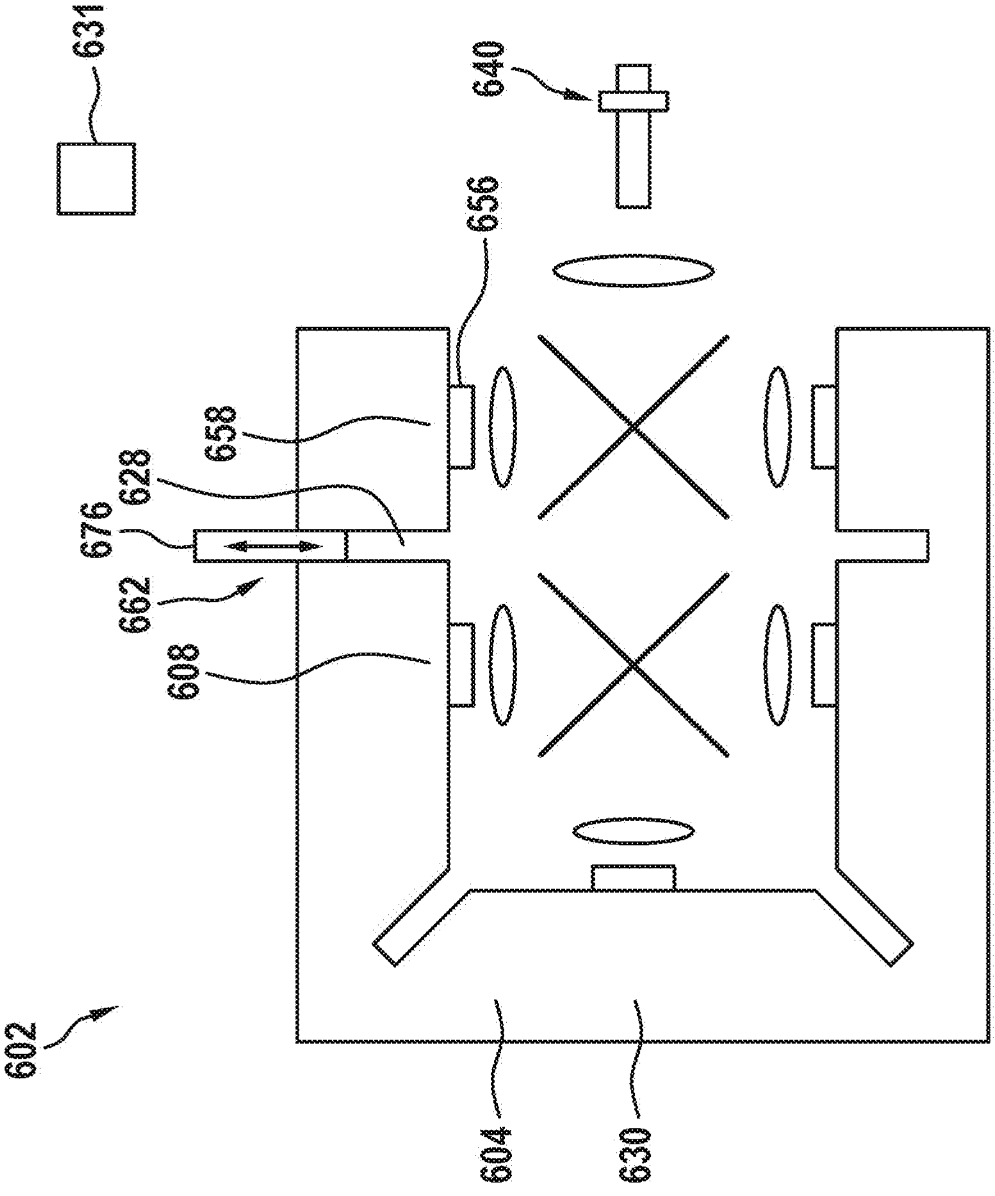
FIG. 12 shows a further embodiment of an illumination device comprising a thermal bridge.

FIG. 12 shows a further embodiment of an illumination device 602, wherein this differs from the embodiment in FIG. 11 only by an adjusting element 662 which is arranged between a first cooling body section 608 and a fourth cooling body section 658. For example, the illumination device 602 has a common cooling body 630 and an optical interface 640. The illumination device 602, in particular the adjusting element 662, comprises a thermal bridge 676 which can be selectively inserted between the first cooling body section 608 and the fourth cooling body section 658. This allows the heat flow adjusted by the adjusting element 662 to be changed. In addition, the illumination device 602 comprises a controller 631 which is configured to control an insertion state of the thermal bridge 676. For example, the heat flow can be adjusted by the insertion state in such a way that an operating temperature of a fourth illuminant 656 can be adjusted and/or kept in an application-specific manner. In particular, the size of a recess 628 that separates the first cooling body section 608 from the fourth cooling body section 658 can be adjusted by the insertion state.

A thermal bridge functionally equivalent to the thermal bridge 676 can be combined with any embodiment of an illumination device that comprises a recess described herein.

Figure 13:
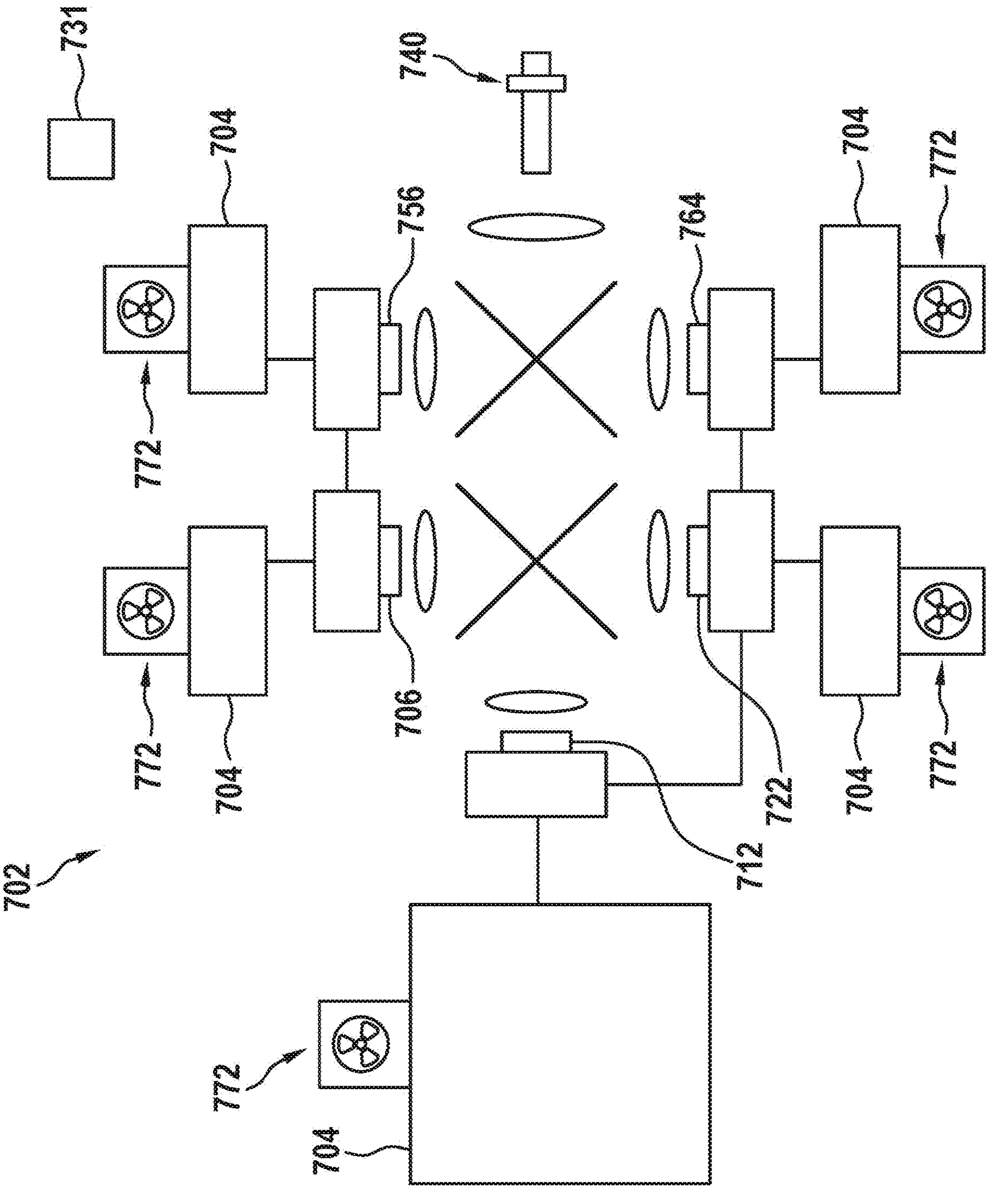
FIG. 13 shows a further embodiment of an illumination device comprising a multi-part heat sink and a plurality of fans.

FIG. 13 shows another embodiment of an illumination device 702 with an optical interface 740. This has a great similarity to the embodiment of the illumination device 102 shown in FIG. 7. What is different is that the illumination device 702 comprises a heat sink 704 which is designed in multiple parts. In particular, the heat sink comprises a part or a section for each lighting element 706, 712, 722, 756, 764. Accordingly, the heat sink 704 is designed in five parts. For each part of the heat sink 704, the illumination device 702 comprises a fan 772. The fans 772 are each assigned to a part of the heat sink 704 and are configured to thermally influence the assigned part of the heat sink 704. In particular, a controller 731 is configured to control each of the fans 772 individually. This allows an operating temperature of each of the lighting elements 706, 712, 722, 756, 764 to be individually adjustable. In particular, a temperature of each of the lighting elements 706, 712, 722, 756, 764 can be adjustable.

Figure 14:
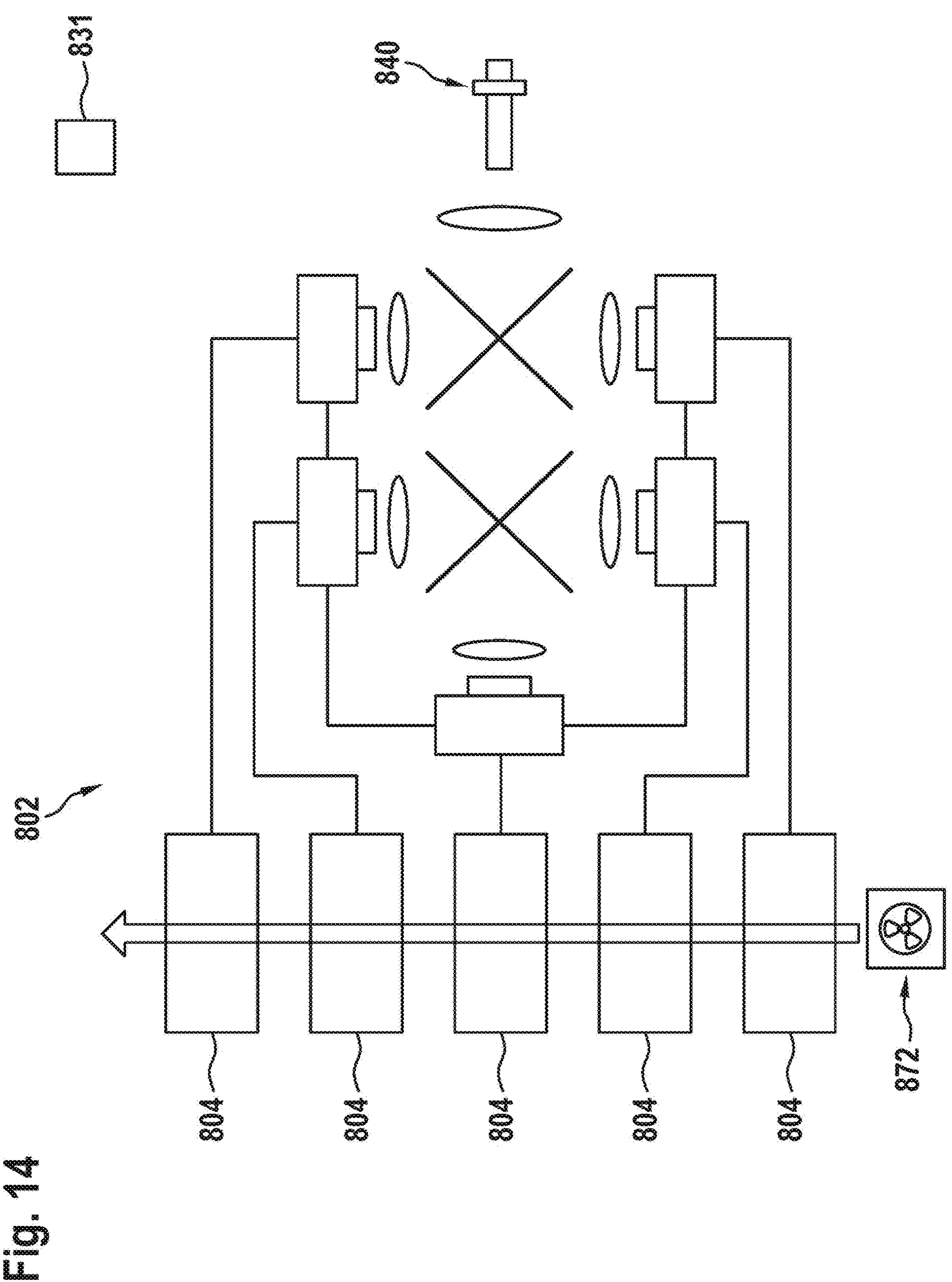
FIG. 14 shows a further embodiment of an illumination device comprising a multi-part heat sink and a fan.

FIG. 14 shows a further embodiment of an illumination device 802 which differs only slightly from the illumination device 702. In the present case, the illumination device 802 comprises an optical interface 840. The illumination device 802 comprises a heat sink 804, which is formed in five parts, and, in contrast to the illumination device 702, only one fan

872. The fan 872 is provided for thermally influencing, in particular for ventilating, all parts of the heat sink 804.

LIST OF REFERENCE SIGNS

10 Imaging device
12 Illumination device
14 Imaging instrument
16 Optical interface
20 Lighting element
22 Lighting element
24 Lighting element
26 Lighting element
28 Lighting element
30 Beam combiner
32 Beam combiner
34 Input side
36 Input side
37 Input side
38 Input side
40 Input side
41 Input side
42 Output side
44 Output side
54 Common optical path
56 Light-emitting surface
58 Light-emitting surface
60 Light-emitting surface
62 Light-emitting surface
64 Light-emitting surface
74 Display unit
78 Lens
79 Lens
80 Lens
81 Lens
82 Lens
83 Lens
84 Transmission spectrum
85 Transmission spectrum
86 Transmission spectrum
87 Transmission spectrum
90 Mirror
92 Mirror
94 Mirror
96 Mirror
102 Illumination device
104 Heat sink
106 First lighting element
108 First cooling body section
110 First waste heat path
112 Second lighting element
114 Second cooling body section
116 Second waste heat path
118 Adjusting element
122 Third lighting element
124 Third cooling body section
126 Third waste heat path
127 Additional adjusting element
131 Controller
134 Heat pipe
136 Thermal bridge
140 Optical interface
156 Fourth lighting element
158 Fourth cooling body section
160 Fourth waste heat path
162 Additional adjusting element
164 Fifth lighting element
166 Fifth cooling body section
168 Fifth waste heat path
170 Additional adjusting element
172 Fan
202 Illumination device
204 Heat sink
206 Lighting element
208 Cooling body section
210 Waste heat path
212 Lighting element
214 Cooling body section
216 Waste heat path
218 Adjusting element
220 Recess
222 Lighting element
224 Cooling body section
226 Waste heat path
228 Recess
230 Cooling body
231 Controller
232 Inner region
234 Heat pipe
240 Interface
242 Abscissa
244 Ordinate
246 Curve
247 Maxima
248 Maxima
249 Maxima
250 Curve
252 Curve
254 Dependence
256 Lighting element
258 Cooling body section
260 Waste heat path
262 Adjusting element
264 Lighting element
266 Cooling body section
268 Waste heat path
270 Adjusting element
272 Fan
302 Illumination device
304 Heat sink
308 Cooling body section
310 Waste heat path
314 Cooling body section
316 Waste heat path
318 Adjusting element
320 Recess
324 Cooling body section
326 Waste heat path
327 Adjusting element
328 Recess
330 Cooling body
331 Controller
340 Optical interface
360 Waste heat path
362 Adjusting element
366 Cooling body section
368 Waste heat path
370 Adjusting element
372 Fan
402 Illumination device
406 Lighting element
412 Lighting element
414 Cooling body section
418 Adjusting element

420 Recess
422 Lighting element
424 Cooling body section
427 Adjusting element
428 Recess
431 Controller
440 Optical interface
456 Lighting element
458 Cooling body section
462 Adjusting element
464 Lighting element
466 Cooling body section
470 Adjusting element
502 Illumination device
504 Heat sink
508 Cooling body section
531 Controller
540 Optical interface
556 Lighting element
558 Cooling body section
562 Adjusting element
574 Switching element
602 Illumination device
604 Heat sink
608 Cooling body section
630 Cooling body
631 Controller
640 Optical interface
656 Lighting element
662 Adjusting element
676 Thermal bridge
702 Illumination device
704 Heat sink
706 Lighting element
712 Lighting element
722 Lighting element
731 Controller
740 Optical interface
756 Lighting element
772 Fan
802 Illumination device
804 Heat sink
840 Optical interface
872 Fan

The invention claimed is:

1. An illumination device, in particular for providing illumination light for a medical imaging instrument such as an endoscope, comprising:

at least one heat sink;

at least one first lighting element;

at least one first cooling body section which is thermally coupled to the first lighting element and which is configured to absorb waste heat from the first lighting element;

at least one first waste heat path which thermally connects the first cooling body section to the heat sink so that the waste heat of the first lighting element can be dissipated via the first waste heat path;

at least one second lighting element;

at least one second cooling body section which is thermally coupled to the second lighting element and which is configured to absorb waste heat from the second lighting element;

at least one second waste heat path which thermally connects the second cooling body section to the heat sink so that the waste heat of the second lighting element can be dissipated via the second waste heat path; and at least one adjusting element which is arranged between the first cooling body section and the second cooling body section and which is configured to adjust a heat flow from the first cooling body section to the second cooling body section.

2. The illumination device according to claim 1, wherein the adjusting element adjusts the heat flow from the first cooling body section to the second cooling body section in such a way that the first cooling body section is largely thermally decoupled from the second cooling body section.

3. The illumination device according to claim 1, wherein the first cooling body section and the second cooling body section are integrally formed.

4. The illumination device according to claim 1, wherein the adjusting element comprises a recess that separates the first cooling body section from the second cooling body section.

5. The illumination device according to claim 1, further comprising:

at least one third lighting element;

at least one third cooling body section which is thermally coupled to the third lighting element and which is configured to absorb waste heat from the third lighting element;

at least one third waste heat path which thermally connects the third cooling body section to the heat sink so that the waste heat of the third lighting element can be dissipated via the third waste heat path; and at least one further adjusting element which is arranged between the second cooling body section and the third cooling body section and which is configured to adjust a heat flow from the second cooling body section to the third cooling body section in such a way that it differs from the heat flow between the first cooling body section and the second cooling body section.

6. The illumination device according to claim 4, wherein the further adjusting element comprises a further recess which separates the second cooling body section from the third cooling body section, wherein a size of the recess differs from a size of the further recess.

7. The illumination device according to claim 1, further comprising a common cooling body, wherein the first cooling body section and the second cooling body section are part of the common cooling body.

8. The illumination device according to claim 7, wherein the common cooling body defines an interior region in which the first lighting element and the second lighting element are arranged.

9. The illumination device according to claim 1, further comprising a control which is configured to activate at least one of the lighting elements for preheating in a preheating mode in order to preheat another of the lighting elements to its operating temperature by means of its waste heat.

10. The illumination device according to claim 9, wherein the controller is configured to prevent operation in a normal operating mode until the operating temperature is reached by preheating.

11. The illumination device according to claim 1, wherein the heat flow adjusted by the adjusting element is variable.

12. The illumination device according to claim 1,
wherein the heat flow adjusted by the adjusting element depends on a temperature of the first cooling body section, of the second cooling body section and/or of the heat sink.

13. The illumination device according to claim 1,
wherein the adjusting element defines at least one first adjusted state below a first temperature in which a larger heat flow is adjusted, and defines at least one second adjusted state above a second temperature in which a smaller heat flow is adjusted.

14. The illumination device according to claim 1,
wherein the adjusting element comprises at least one heat pipe.

15. The illumination device according to claim 1,
wherein the adjusting element comprises at least one thermal bridge which can be optionally inserted between the first cooling body section and the second cooling body section.

16. The imaging device comprising:
an illumination device according to claim 1; and
an imaging instrument that can be connected to the illumination device.

* * * * *